United States Patent
Gardiner

(10) Patent No.: US 11,248,763 B2
(45) Date of Patent: Feb. 15, 2022

(54) HIGH EFFICIENCY EXTERNAL DAYLIGHTING DEVICES

(71) Applicant: SerraLux Inc., Los Gatos, CA (US)

(72) Inventor: Mark E Gardiner, Santa Rosa, CA (US)

(73) Assignee: SERRALUX INC., Los Gatos, CA (US)

( * ) Notice: Subject to any disclaimer, the term of this patent is extended or adjusted under 35 U.S.C. 154(b) by 0 days.

(21) Appl. No.: 16/902,653

(22) Filed: Jun. 16, 2020

(65) Prior Publication Data

US 2020/0348003 A1     Nov. 5, 2020

Related U.S. Application Data

(63) Continuation of application No. 15/582,366, filed on Apr. 28, 2017, now Pat. No. 10,683,979.

(Continued)

(51) Int. Cl.

| | |
|---|---|
| *F21S 11/00* | (2006.01) |
| *G02B 17/00* | (2006.01) |
| *E04F 10/08* | (2006.01) |
| *G02B 5/04* | (2006.01) |
| *E06B 1/00* | (2006.01) |
| *E04F 10/10* | (2006.01) |
| *G02B 19/00* | (2006.01) |
| *E06B 9/24* | (2006.01) |

(52) U.S. Cl.
CPC ............ *F21S 11/007* (2013.01); *E04F 10/08* (2013.01); *E04F 10/10* (2013.01); *E06B 1/00* (2013.01); *G02B 5/04* (2013.01); *G02B 5/045* (2013.01); *G02B 17/00* (2013.01); *G02B 17/006* (2013.01); *G02B 19/0042* (2013.01); *E06B 2009/2417* (2013.01)

(58) Field of Classification Search
CPC .............. F21S 11/007; G02B 19/0019; G02B 19/0042; E06B 2009/2417; E06B 1/00; E06B 1/04; E04F 10/08; E04F 10/10
See application file for complete search history.

(56) References Cited

U.S. PATENT DOCUMENTS

| | | | |
|---|---|---|---|
| 4,509,825 A | 4/1985 | Otto et al. | |
| 4,978,181 A * | 12/1990 | Inanuma | B32B 17/10018 359/360 |

(Continued)

OTHER PUBLICATIONS

PCT ISR and Written Opinion on Patentability in PCT/US2017/30301.

*Primary Examiner* — Christopher E Mahoney
(74) *Attorney, Agent, or Firm* — Edward S. Sherman

(57) ABSTRACT

A external light control device for equatorially located building utilizes tilting external light shelves that are capable of tilting backward (toward the building) from a vertical orientation to reflect low am (or late pm) sun away from occupants, but are deployed at a tilt away from the building exterior to capture more sun closer to noon time. The structure preferably integrate IR rejecting coating for incident light which is re-directed by TIR surface disposed normal to the thin film layers in a multi-layer IR reflective coating. The panel may be monolithic or comprise tilting louvers, which can be metallic, dielectric, or TIR reflectors. The louvers preferably also tilt in response to the determined sun position with the panel to optimize light utilization.

8 Claims, 24 Drawing Sheets

Related U.S. Application Data

(60) Provisional application No. 62/329,607, filed on Apr. 29, 2016.

(56) References Cited

U.S. PATENT DOCUMENTS

| | | | |
|---|---|---|---|
| 5,461,496 A * | 10/1995 | Kanada | E06B 9/24 |
| | | | 359/592 |
| 6,311,437 B1 | 11/2001 | Lorenz | |
| 9,188,296 B2 | 11/2015 | Gommans | |
| 9,695,629 B2 * | 7/2017 | Kostro | E06B 3/6722 |
| 9,803,818 B2 | 10/2017 | Nango et al. | |
| 10,227,820 B2 | 3/2019 | Kanno et al. | |
| 10,302,264 B2 | 5/2019 | Nishinaka et al. | |
| 2009/0009870 A1 | 1/2009 | Usami | |
| 2011/0199685 A1 * | 8/2011 | Ito | G02B 5/045 |
| | | | 359/589 |
| 2012/0327507 A1 | 12/2012 | Padiyath et al. | |
| 2014/0020852 A1 * | 1/2014 | Thielemann | F04D 25/0606 |
| | | | 160/127 |
| 2015/0129140 A1 * | 5/2015 | Dean | E06B 9/68 |
| | | | 160/5 |
| 2015/0226394 A1 | 8/2015 | Ueki et al. | |
| 2015/0285454 A1 * | 10/2015 | Aizenberg | F21S 11/007 |
| | | | 359/226.3 |
| 2016/0178164 A1 | 6/2016 | Nishida et al. | |
| 2017/0314752 A1 | 11/2017 | Yui et al. | |
| 2018/0163938 A1 | 6/2018 | Yui et al. | |

* cited by examiner

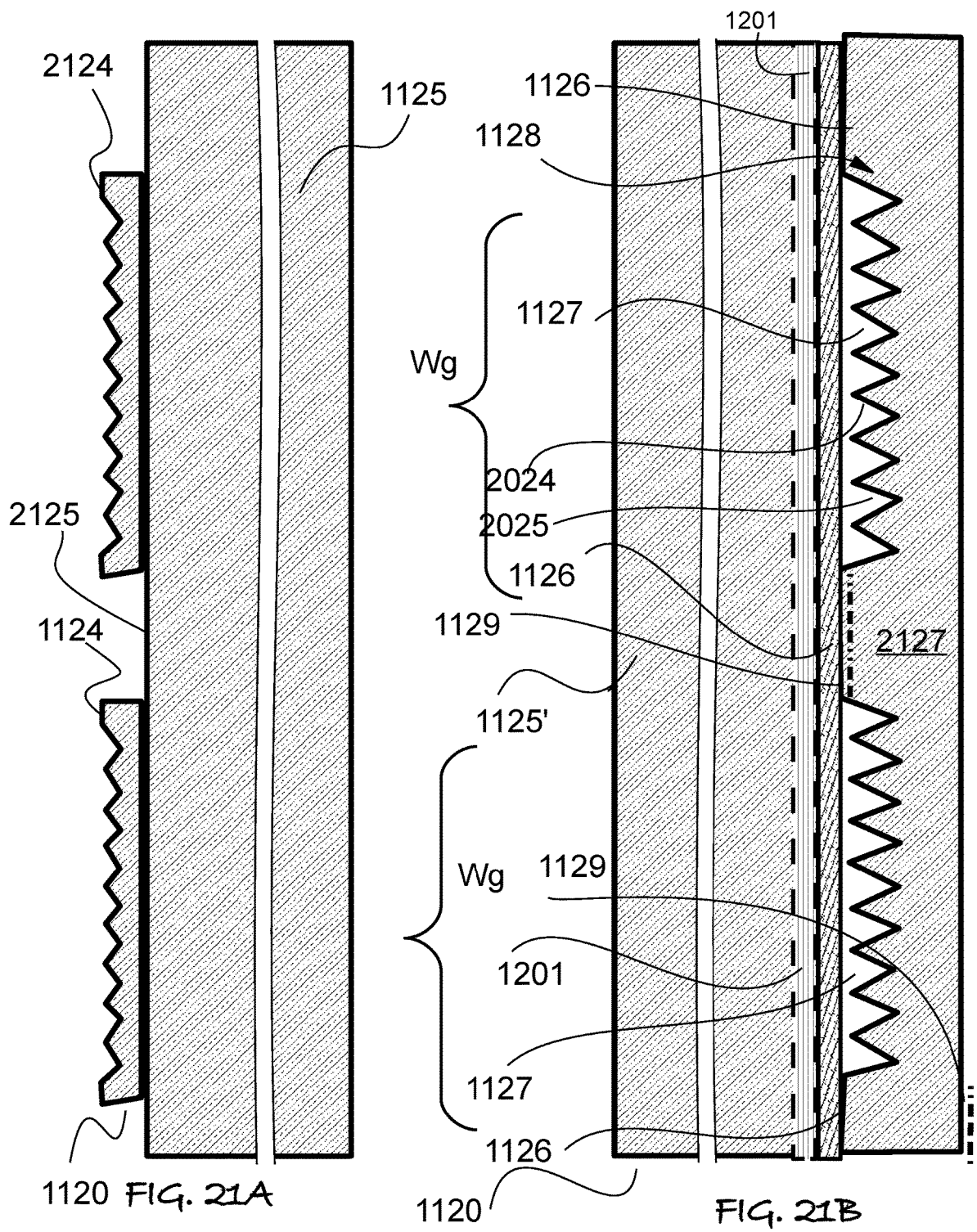

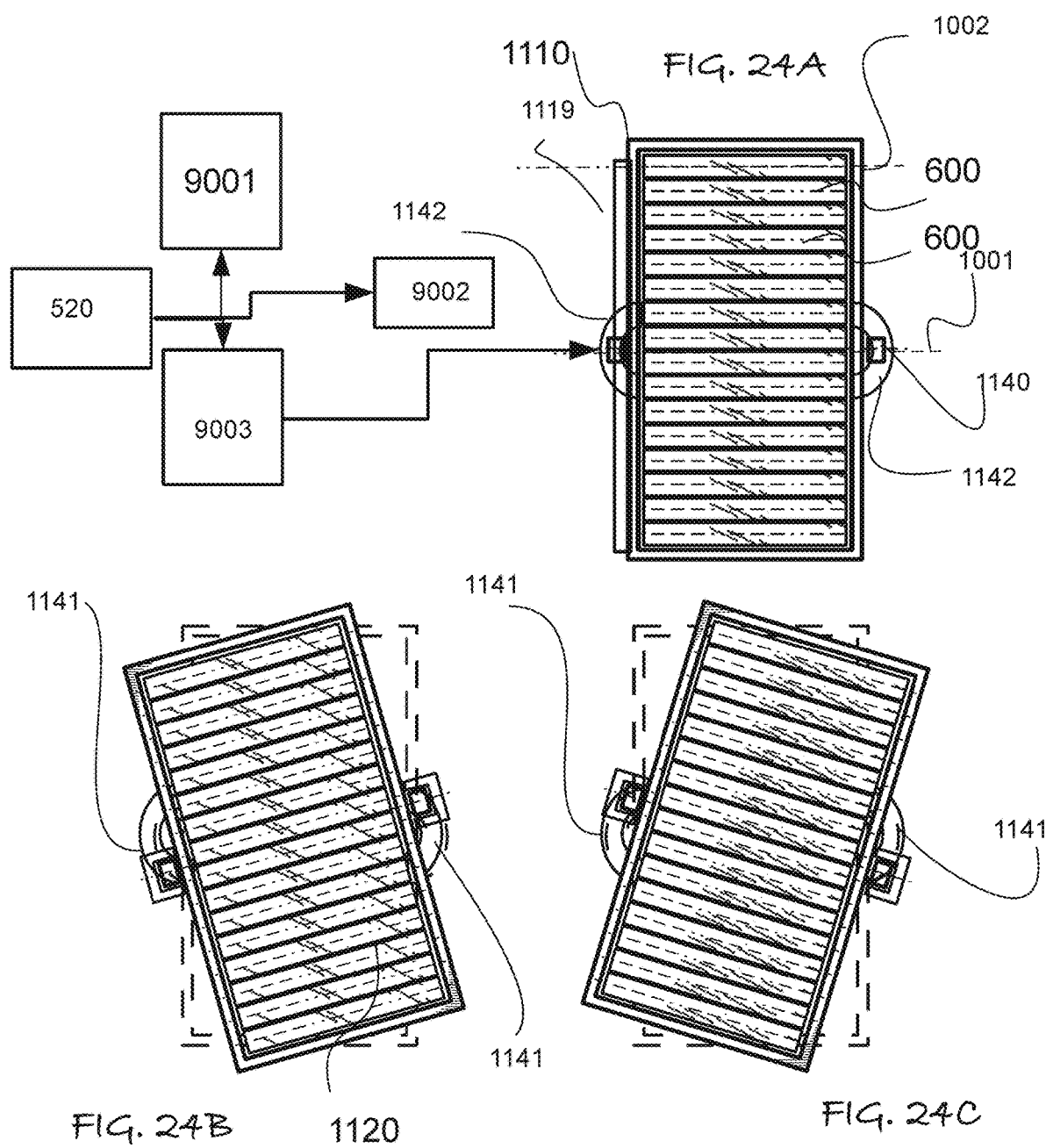

HIGH EFFICIENCY EXTERNAL DAYLIGHTING DEVICES

CROSS REFERENCE TO RELATED APPLICATIONS

The present application claims the benefit of priority the U.S. Non-Provisional Patent application of the same title, which was filed on Apr. 28, 2017, having Ser. No. 15/582,366, which issued as U.S. Pat. No. 10,683,979 on Jun. 16, 2020, and is incorporated herein by reference.

The present application claims the benefit of priority the U.S. Provisional Patent application of the same title, which was filed on Apr. 29, 2016, having application Ser. No. 62/329,607 and is incorporated herein by reference.

BACKGROUND OF INVENTION

The field of invention is building construction, and more specifically exterior optical assemblies for directing light into buildings.

It has long been recognized that various optical components placed on the exterior of buildings can capture external light and transmit it to the interior of a building through glazing structures. Such structures have been incorporated on rooftops to increase the efficiency of skylights, as well as over external side wall glazing to capture exterior sunlight.

Such structures have typically been various types of mirrors that merely re-directly the light into the interior.

There has always been a tradeoff between the quantities of light captured to minimize the undesirable effects of excess light, such as direct glare to occupants, as well as the undesirable excess heat during the warmer seasons of the year.

It would be advantageous to provide a means to capture external light and re-direct it in a manner that avoids glare or other forms of excess brightness, as well as solar heating effects that is also dynamically responsive to the changing solar elevation angle throughout the day.

The above and other objects, effects, features, and advantages of the present invention will become more apparent from the following description of the embodiments thereof taken in conjunction with the accompanying drawings

SUMMARY OF INVENTION

In the present invention, the first object is achieved by providing an apparatus for exterior light control, the apparatus comprising a first and second elongated supporting member, each being spaced apart from the other with the principle axis disposed parallel to define a first plane, one or more optical panel is attached at opposing sides to the each of the first and second elongated supporting member, a pair of pivoting brackets, each bracket having; a means for vertical surface mounting to a second plane; and connecting opposing sides of the panel for adjustably disposing the first plane between a positive and negative orientation with respect to a second plane.

A second aspect of the invention is characterized by a building structure comprising a plurality of exterior vertical walls, at least one wall having at least one penetration covered by a glazing panel, the apparatus for exterior light control of claim 1 attached to the exterior wall by the pivoting brackets and disposing the first plane between a positive and negative orientation with respect to at least one wall as the second plane.

In the present invention, the first object is achieved by providing an apparatus for exterior light control, the apparatus comprising a first and second elongated supporting member, each being spaced apart from the other with a principle axis of each member having a portion disposed in the same direction as the other define a first plane, one or more planar optical panels attached at an opposing sides to the each of the first and second elongated supporting member to each portion to dispose the planar optical panel in the first plane. a pair of pivoting brackets, each bracket having; a means for vertical surface mounting to a second plane; and a pivoting coupling to the first and second elongated supporting members that is operative for adjustably disposing the planar optical panel between a positive and negative orientation with respect to a second plane, wherein the planar optical panels comprise a plurality of reflective elements that are operative to redirect incident light via transmission through the planar optical panel toward the second plane.

A second aspect of the invention is characterized such an apparatus for exterior light control wherein the reflective optical elements re-direct light by total internal reflection.

Another aspect of the invention is characterized by any such an apparatus for exterior light control wherein the reflective optical elements re-direct light by total internal reflection and have a periodic pitch that is greater than at least about 500 microns.

Another aspect of the invention is characterized by any such an apparatus for exterior light control wherein the optical panel comprises a plurality of louvers.

Another aspect of the invention is characterized by any such an apparatus for exterior light control wherein the pivot brackets are connected at opposing sides of the planar optical panel at a mid-point between each of the first and second elongated supporting members.

Another aspect of the invention is characterized by any such an apparatus for exterior light control wherein the pivot brackets have a length that is greater than half the length of the first and second elongated supporting members for rotating the one or more optical panels from an upright to an inverted position without contacting the second plane.

Another aspect of the invention is characterized by any such an apparatus for exterior light control wherein the louvers comprise a light re-directing optical panel that is disposed between two IR reflective layers on opposing sides and the light redirecting optical panel is operative to absorb light incident at a direction above a normal direction in a first orientation and re-direct light incident at a direction above a normal direction in a second orientation in which the louvers are inverted from the first orientation.

Another aspect of the invention is characterized by any such an apparatus for exterior light control wherein the louvers comprise a light re-directing optical panel that is disposed between two IR reflective layer on opposing sides and the light redirecting optical panel.

Another aspect of the invention is characterized by any such an apparatus for exterior light control wherein the louvers comprise a plurality of alternating bands of adjacent piano see-through regions and light redirecting regions wherein the bands extend in the direction of the louvers and transverse to the elongated supporting members.

Another aspect of the invention is characterized by any such an apparatus for exterior light control wherein the louvers are disposed with a primary axis that extends in the same direction as the first and second elongated supporting members and the louvers are coupled to the first and second supporting elongated members to rotate about the primary axis.

Another aspect of the invention is characterized by any such an apparatus for exterior light control wherein the louvers are operative to be independently rotated about a primary axis independent of a pivoting movement of the planar optical panel between a positive and negative orientation with respect to a second plane.

Another aspect of the invention is characterized by any such an apparatus for exterior light control further comprising a means to reflect infrared radiation.

Another aspect of the invention is characterized by any such an apparatus for exterior light control further comprising a means for rotation of the pair of pivoting bracket about an axis that is disposed normal to the second plane and midway between the pivoting brackets.

Another aspect of the invention is characterized by any such an apparatus for exterior light control further comprising a control system that is operative to pivot the one or more planar optical panels to follow a trajectory of the sun.

Another aspect of the invention is characterized by any such an apparatus for exterior light control further comprising a control system that is operative to pivot the louver and the one or more planar optical panels to follow a trajectory of the sun.

Another aspect of the invention is characterized by any such an apparatus for exterior light control further comprising a control system that is operative to pivot the one or more planar optical panels to follow a trajectory of the sun.

Another aspect of the invention is characterized by an optical component comprising a plurality of alternating bands of adjacent; planar see-through regions and light redirecting regions in which the light re-directing regions are transparent and re-direct light by total internal reflection, in which the planar see-through regions are wider than the spacing of adjacent light redirect elements in the light re-directing regions.

Another aspect of the invention is characterized by any such optical component wherein the light re-directing regions have a plurality of facets that are disposed at an oblique angle with respect to the planar see-through regions.

Another aspect of the invention is characterized by any such optical component wherein the planar see-through regions attenuate incident light by absorption.

Another aspect of the invention is characterized by any such optical component further comprising a means for reflecting infrared radiation.

Another aspect of the invention is characterized by any such optical component wherein the planar see through region are disposed above a top of the plurality of facets.

Another aspect of the invention is characterized by any such optical component wherein the planar see through region are attached to a planar transparent optical panel to provide a gap between the facets of the light re-directing regions.

Another aspect of the invention is characterized by any such optical component wherein an infrared radiation reflective layered structure is disposed between the planar transparent optical panel and the light re-directing regions by attaching the planar see-through regions to the infrared radiation reflective layered structure.

Another aspect of the invention is characterized by a building structure comprising a plurality of exterior vertical walls, at least one wall having at least one penetration covered by a glazing panel, the apparatus for exterior light control of claim 1 attached to the exterior wall by the pivoting brackets and disposing the first plane between a positive and negative orientation with respect to at least one wall as the second plane. The above and other objects, effects, features, and advantages of the present invention will become more apparent from the following description of the embodiments thereof taken in conjunction with the accompanying drawings.

BRIEF DESCRIPTION OF DRAWINGS

FIGS. 21A and 21B are alternative embodiment of a louver or panel.

FIG. 24A-C are front elevation views of alternative positions of a frame that rotates about an addition axis to follow the arcing solar trajectory for optimal collection of solar radiation.

DETAILED DESCRIPTION

Figure 1:
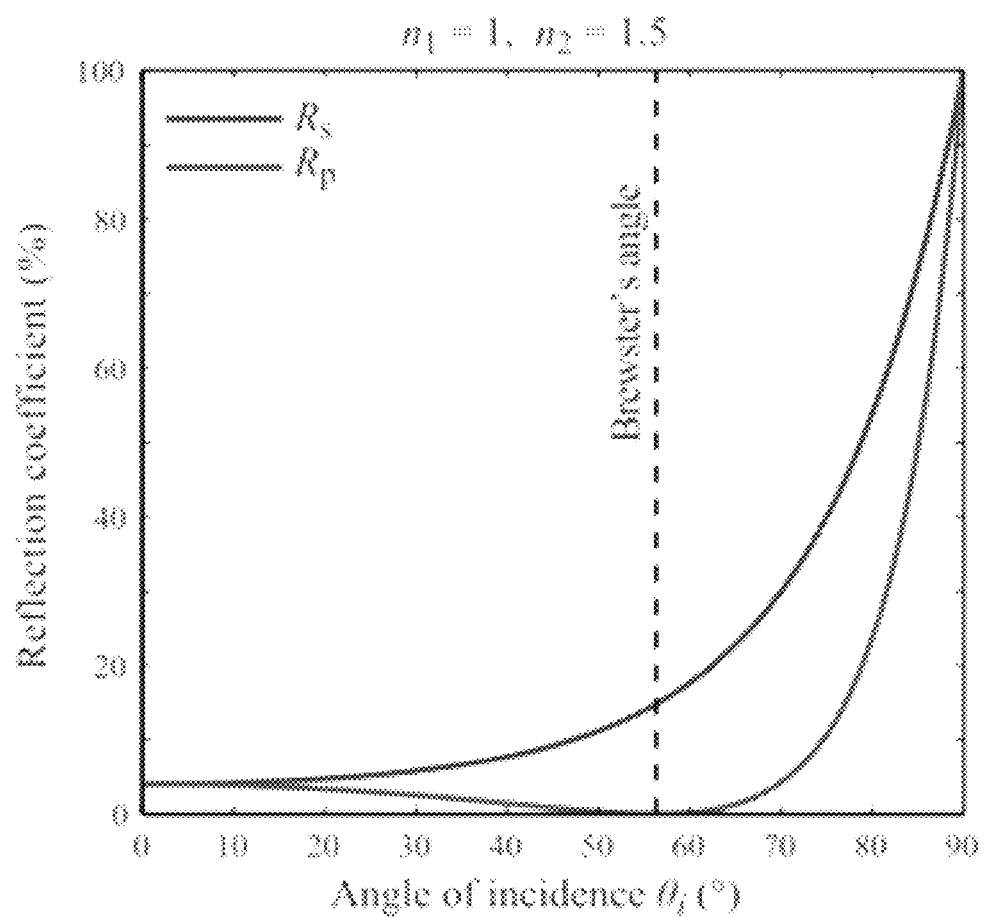
FIG. 1 is a plot of the Fresnel reflection coefficients as a function of angle of incidence

Referring to FIGS. 1 through 23C, wherein like reference numerals refer to like components in the various views, there is illustrated therein a new and improved High Efficiency External Daylighting Devices, generally denominated 1000 herein.

An objective of the invention is to provide daylighting constructions with improved efficiency in geographic locations of low latitudes, from 0 to 30 degrees, which is roughly latitudes equivalent to south of northern Florida and north of southern Brazil in the Western hemisphere and Shanghai to Brisbane in the Eastern Hemisphere. In these latitudes the sun spends significant time during the daily sun cycle at elevation angles above 60 degrees and especially above 70 degrees.

At high sun angles, daylighting efficiency is greatly diminished by Fresnel reflection losses from vertical fenestrations and from cosine losses of the glazing projected area.

In regard to the losses associated with Fresnel reflection on glazing of n=1.5, FIG. 1 shows the rapidly increasing Fresnel reflection coefficients as a function of incidence angle and polarization.

Figure 2:
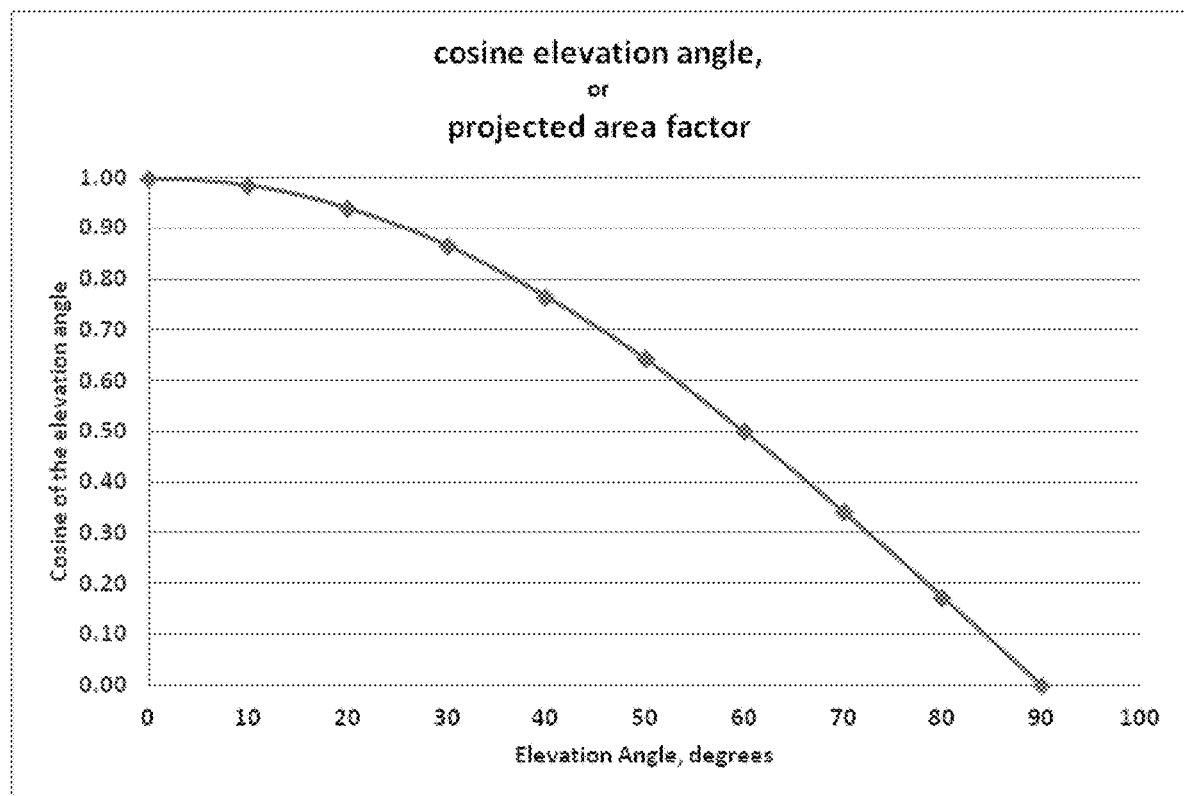
FIG. 2 is a plot of projected areas as a function of angle of incidence

Further, as illustrated in FIG. 2, at high solar elevation angles, the projected area of glazing goes down by the cosine of the elevation angle. That is, the amount of daylight intercepted by a vertical fenestration goes down by the product of the window area and the cosine of the sun elevation angle, as shown in the plot below. This means that the projected window area is effectively "0" when the sun is at 90 degrees elevation, as the cosine of 90 degrees is zero.

It is an object of the invention to provide for the more efficient utilization of sunlight for interior lighting when it is at high elevations, greater than about 65 degrees, but also to preclude or shade the occupants from low angle sun that would be present as either glare or direct images of the solar disk at eye level. Glare should be understood to be areas of high brightness that would be visible when an internal observer or room occupants looks outward to a window 15.

It has been discovered that improvements are preferably obtained by providing light re-directing components externally to building structures to increase the projected area and decrease the incidence angle to significantly increase the amount of available daylight that can be re-directed in a useful manner by preferred embodiment of these external constructions.

It should be appreciated that since the inventive structure and devices described in further details below can be deposed between the room intended to receive enhanced illumination from exterior light, which includes sunlight, and the source of the exterior light, the terms "exterior", "external" and "externally" are also intended to embrace applications to rooms or floor space portions without windows, such as in indoor atriums, that for example have skylight windows. According, exterior means a placement of the device between the room or space that is intended to receive enhanced illumination from a light source distal from the room or space when the apparatus is placed between the room or space and the lighting source. For simplicity, most embodiments will be described with respect to the sun being the source of illumination and room or space being an interior of the building in which opening are covered by window glazing.

The preferred embodiments of these improved constructions are implemented on a macro level with respect to building structure as well as at a micro-level of the optical element construction to optimize the performance and versatility of the devices, as well as manage the issue of solar heating, which occurs year round at tropical latitudes, that is about ±23 degree latitude.

In accordance with the various aspects of the present invention the High Efficiency External Daylighting Devices 1000 is deployed on the exterior vertical wall 17 of the building with a vertical exterior window or glazing 15. The device 1000 comprises a frame 1110 and one of more optical light redirecting elements 1124 of optical panel 1120 having a transmitting portion 1125 that is supported by the frame 1110 via a coupling pivot assembly 1130. The frame 1110 is coupled in rotary engagement by the pivot assembly 1130 with the pivot assembly 1130 and the frame 1110 being spaced away from a building outer or exterior wall 17 by a laterally projecting stand-offs or brackets 1140. The stand-off 1140 displaces the primary or pivot axis 1001 of the assembly 1130 and the one of more optical light redirecting panel 1120 laterally away from the glazing 15. The frame 1110 to support the optical panel comprises at least a first and second elongated supporting member, each being spaced apart from the other with a principle axis of each member having a portion disposed in the same direction as the other define a first plane. The frame 1110 and elongated members can have various shape, but the portion are provided in a configuration to dispose the planar optical panel in the first plane so that it can be tilted with respect to an adjacent wall or window of a building that is in a second spaced apart plane. The optical light redirecting element 1120 can be one or more planar optical panels attached at opposing sides to the each of the first and second elongated supporting member via such portions.

Figure 3:
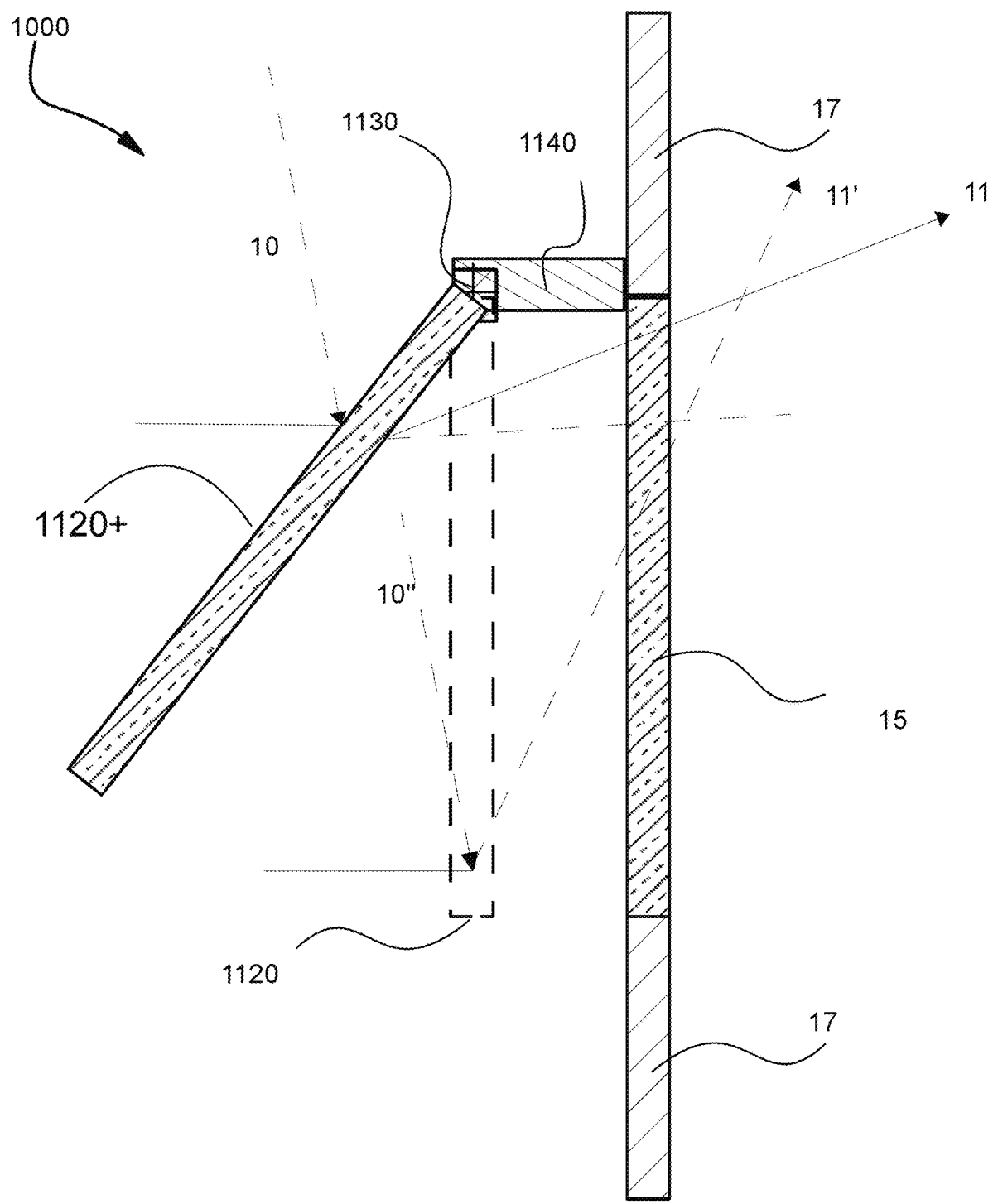
FIG. 3 is a schematic side elevation view of a first embodiment of the invention with the frame tilted away from window and building.
Figure 4:
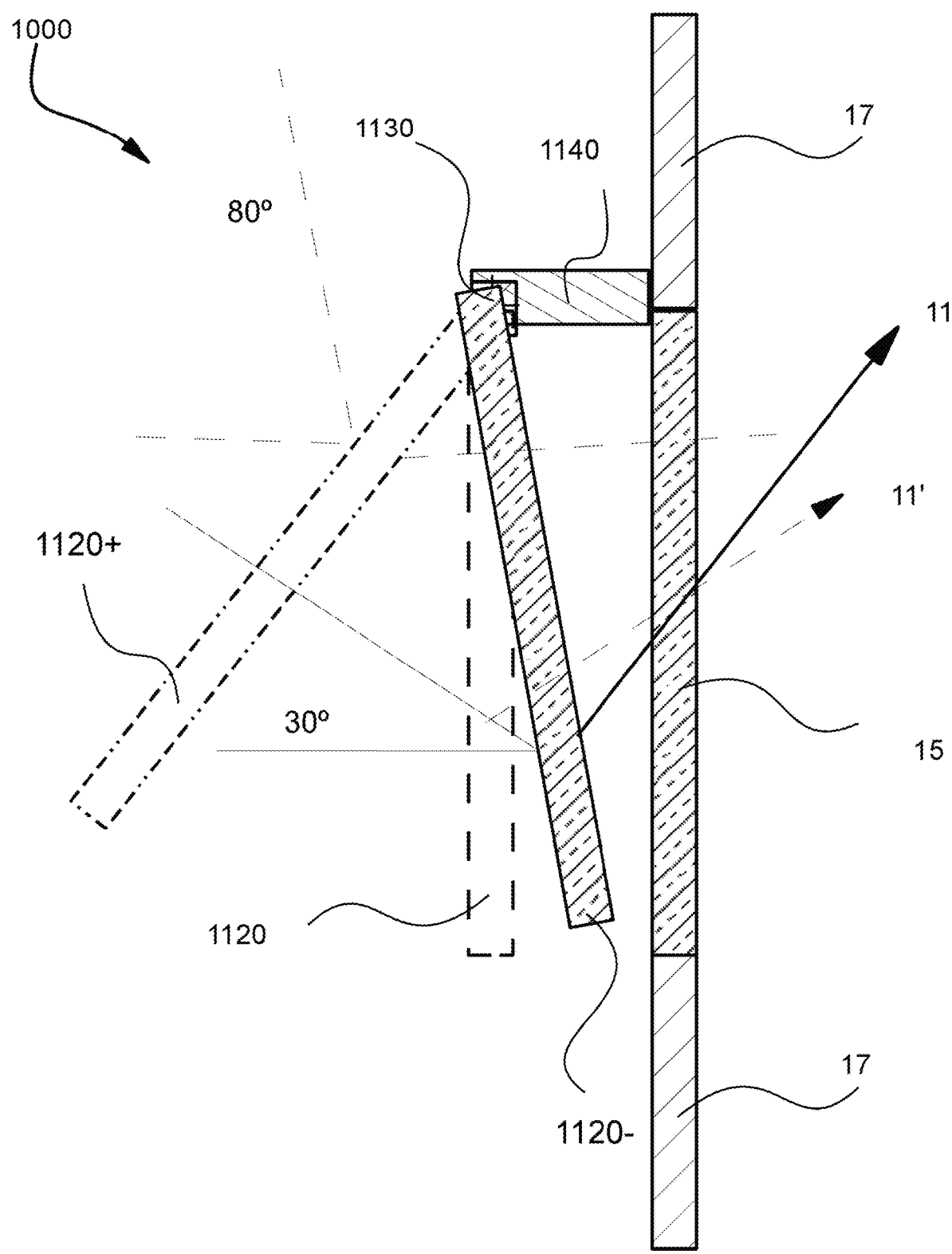
FIG. 4 is a schematic side elevation view of a first embodiment of the invention with the frame in vertical orientation and the optional negative tilt orientation.

The pivot assembly 1130 may be operative to dispose the more optical panels redirecting 1120 and the light redirecting elements 1124 thereof at both positive (1120+ in FIG. 3) and negative tilt (1120− in FIG. 4) with respect to the vertical direction or the second plane, as illustrated in FIGS. 3 and 4, by rotation about a primary axis 1001 defined by the pivot assembly 1130.

While a frame 1110 preferably has 3 or more sides, and preferably 4 sides for strength and rigidity, the frame 1110 needs 2 sides or elongated members 1110a and 1110b (FIG. 6) to grasp the optical panel 1120, which can be one formed from or more smaller rigid panels 1121 by assembly tiles. The optical panel 1120 can be formed as a monolith, laminate or by tiling in a common plan other elements or laminates, with other without intervening sub-frames. Alternatively louvers 600 can be stacked by attachment to the frame 1110. Louvers 600 may be have a fixed orientation with respect to the frame 1110, but preferably may pivot or rotate within the frame 1110.

Light re-directing films and sheets are well known and are generally formed by micro-fabrication methods in which the total internal reflection (TIR) surfaces are less than about 1 mm wide. Such micro-fabrication typically deploys micro-replication of a master surface or mold in which a resin impregnates the contours of the master surface so that upon curing and removal the master surface is replicated in reverse. The master surface is generally fabricated by diamond cutting or turning. Some micro-replication methods are well suited to roll to roll processing of wide webs of flexible films. A web of flexible film can be readily slit and cut to custom sizes, as may be required for direct application to an installed window glazing surface, or the glass panel or plates used to fabricate sealed glazing type windows. While in some embodiment the slat or louver 600 or optical panel 1120 that is supported by the frame 1110 may contain a continuous layer of thin flexible film, in more preferred embodiments, the slat or louver is a collection of assembled macro-elements to provide particular performance advantages. FIG. 14-17 illustrate more preferred embodiments that deploy such macro-elements 110. By film, we mean a planar member generally less than several mm in thick and sufficiently non-rigid to be rolled to a radius of about 12 mm with breakage, crazing or plastic deformation. Films can be laminated to thicker members to form generally rigid panels, when the thicker member itself provides 90% percent of the rigidity. Films can be laminated with other films and less rigid members to form more rigid structures as the optical panel 1120. The light re-directing reflective surface 1124 can be formed by various methods, such as in either flexible film, more rigid member members, or laminates thereof, in which the light re-directing reflective surfaces 1124 can be on the front, rear or embedded within such structure. Any of these constructions can be used to form an optical panel 1120, tiles used to form the optical panel or the louvers 600. By louver 600, we mean elongated flat members that are narrow with respect to the longest axis and very thin with respect the next longer or narrower dimension. Such louvers can be formed by tiling shorter louver forming optical elements.

In general, the light re-directing structure 1121 is disposed on or part of at least one of the opposing faces of the planar support to form either the panel 1121 or the louver 600. Hence, at least a portion of the incident light will be selectively re-directed on transmission depending on the angle of incidence. In most embodiments, light at a low angle of incidence when reflected after initial transmission is re-directed above the surface normal to travel in the opposite direction as the incident light, for entering the building through the adjacent window.

Preferably such light re-directing structure deploy multiple adjacent reflective surfaces 1124 oriented for the total internal reflection (TIR) of light impinging on the optical panel 1120 at a higher angle of incidence above the surface normal to be re-directed and exit the panel but also travel upward, but in the same direction as the incident light. Absent the TIR surface, all of the light will travel downward on exit an otherwise plano-plano transparent panel. As TIR only occurs above a critical angle of incidence dependent, replacing TIR with metallic or dielectric reflective surface, allows some portion of near normal incident light to be reflected as well.

It should be appreciated from the ray tracing in FIG. 3, showing incident sunlight as ray 10, as the frame 1110 swings lighting transmitting element 1125+ away from the wall 17 to capture more sunlight, the light captured will be redirected as ray segment 11 at lower angles toward the occupants, and not at the higher angles toward the ceiling 20, as is the case for ray segment 11', which is associated with the vertical panel or frame 1110 supporting the light re-directing element 1120. An aspect of the invention is the configuration and use to address the bothersome natural of low angle sunlight, for which frame 1110 can be tilted in the negative direction, as shown in FIG. 4.

FIG. 4 is a schematic perspective view of an embodiment of the invention showing a frame 1110 that is essentially the same height as the window disposed for positive and negative tilt of the vertical orientation of the frame with respect to the wall 17, including ray tracing of incident sunlight. The negative tilt (1120−) avoids the "leakage" of incident light 10 of near vertical light that does not impinge on the reflective surface in the light re-directing element 1124. This can occur when the light re-directing elements 1124 have reflective surfaces (such as 110a and 110b in FIG. 14-17) that parallel to each other, and transverse to the plane of the frame 1110. The optical panel 1120− of frame 1110 is disposed at negative tilt to optimize the re-direction of low angle incident light, such as on due east or due west facing windows early in the morning or late in the afternoon respectively. In such cases, it is desirable that building occupants are not blinded by direct sunlight, but can still view the exterior landscape or skyline. This can be accomplished different ways with various embodiments, though each way presents some tradeoffs in different aspects of performance. The more preferred embodiments deploy improved structure for the light re-directing components, 1124, be they in the form of monolithic panels of smaller panels or tiles 1121 that are fixed to the frame 1110 or an assembly of louvers 600 that can be rotated independent of the frame 1110 rotation.

Further, at higher solar elevations low angle sun, incident as ray 10 at 30 degrees elevation is re-directed to a higher angle toward the ceiling as ray 11, rather than ray 11' which would occur if the frame 1110 and light re-directing portion 1120 remained vertical. This redirection can be accomplished by titling the frame 1110, or tilting the louvers 600 in a frame 1110 that remains vertical, or any combinations of tilting the frame 1110 and the louvers 600.

Further, as a larger angle of negative tilt re-directs the light at a steeper (or higher angle) into the room, that is toward the ceiling 20 closer to the window 15, more negative tilt may be desired to protect occupants from this direct light if they work or stand close to a window.

Figure 7A:
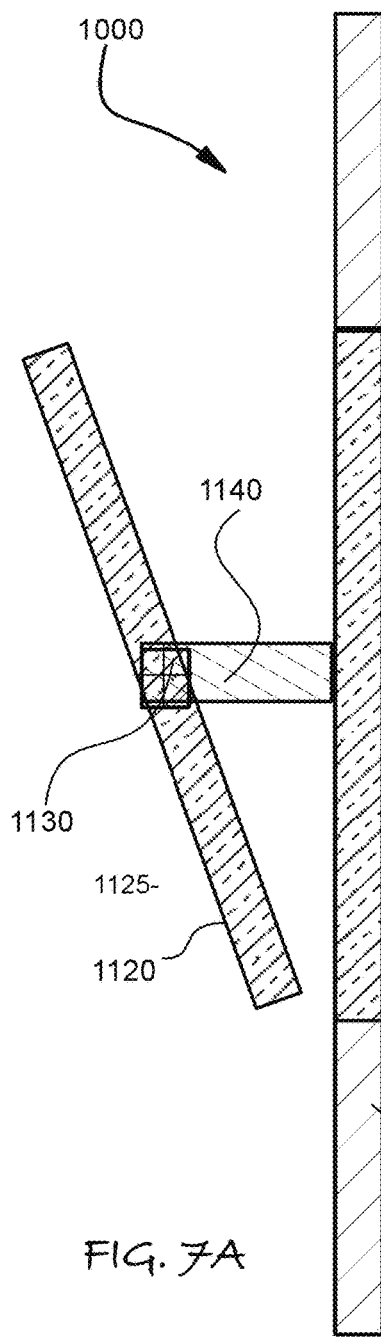
FIG. 7A-C are schematic side elevation views comparing different embodiments of the invention.

The structure of the frame 1110 and stand-off 1140 can limit the extent of the negative tilt, when the bottom of elongated members 1110a/b of the frame 1110 will hit the wall 17 or window 15. The support of the elongated members 110a/b and the frame 1110 as illustrated in FIG. 7A allows greater negative tilt for a given support length in the vertical direction. The combination of negative tilt of the frame 1110 and the louvers 600 provides greater negative tilt. However, tilting louvers 600 may have some detrimental consequences, namely light leakage between TIR surfaces or reflective surface in the light re-directing structure 1120.

Figure 5:
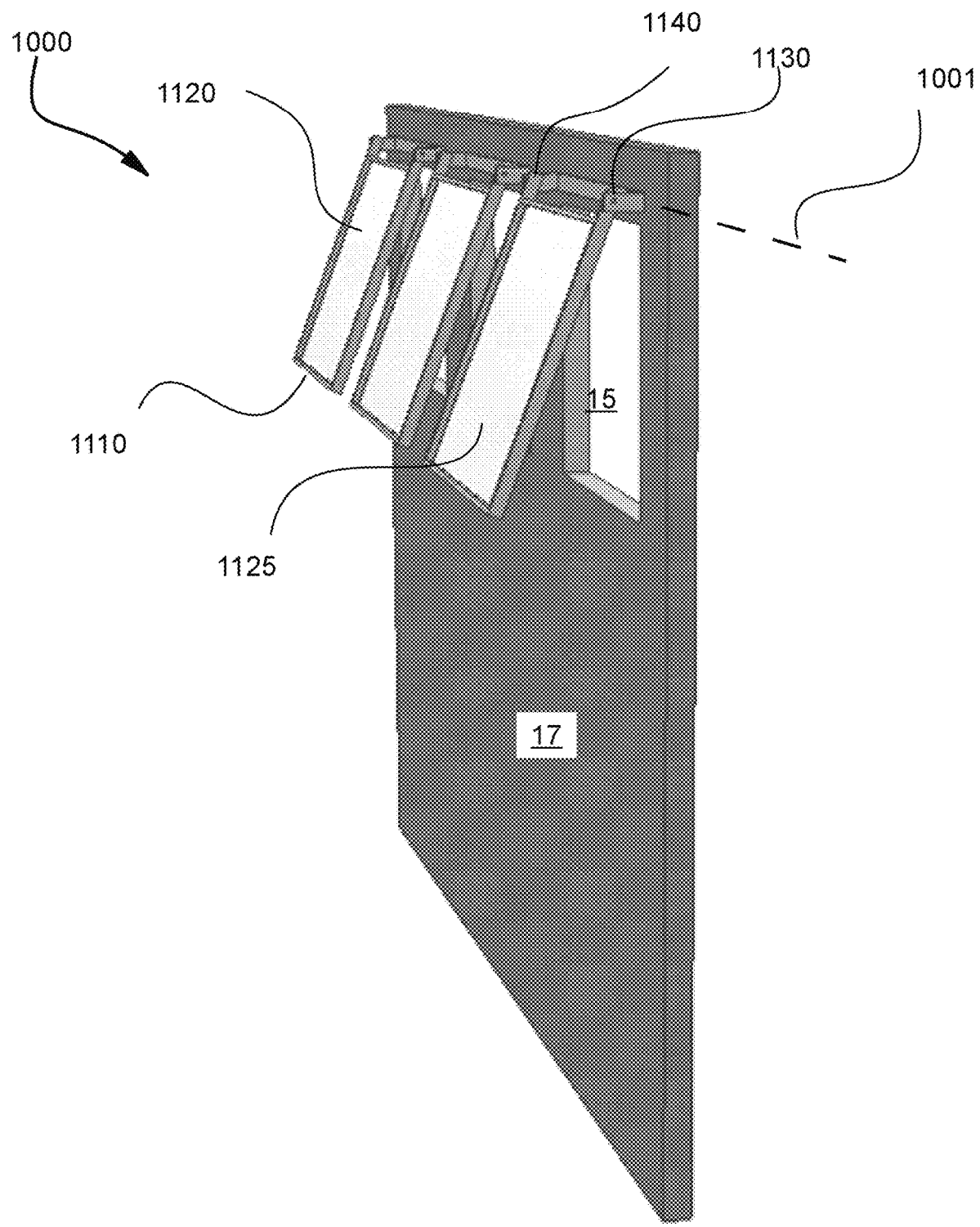
FIG. 5 is a schematic perspective view of the another embodiment of the invention
Figure 6:
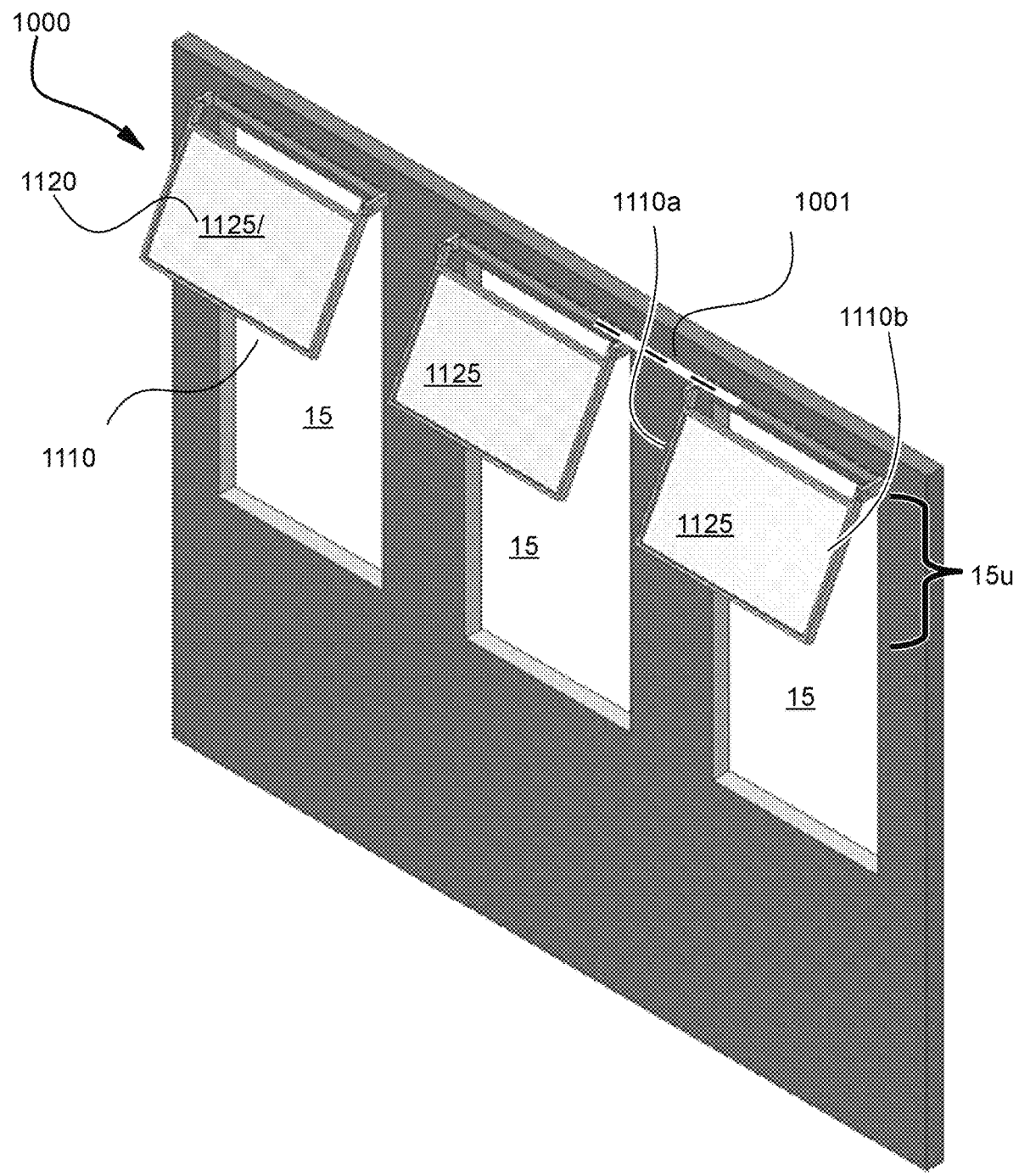
FIG. 6 is a schematic perspective view of another embodiment of the invention.

FIGS. 5 and 6 illustrate respectively in perspective view that the frame 1110 and light re-directing portion 1120 may be deployed over the entire vertical expanse of the window 15 (FIG. 5) or an upper or clerestory portion (FIG. 6) 15u of the window 15. As the clerestory portion 15u is above the eye level of the occupants, it is more acceptable to deploy optical panel 1120 as shown in FIG. 3 in which the re-directed light 11 at a lower angle than ray 11'.

Figure 7B:
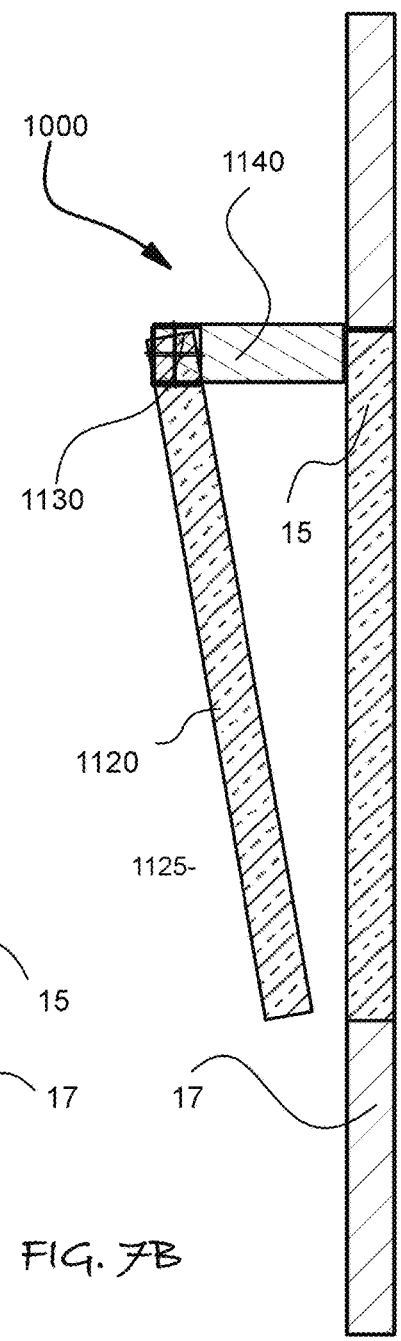
Figure 7C:
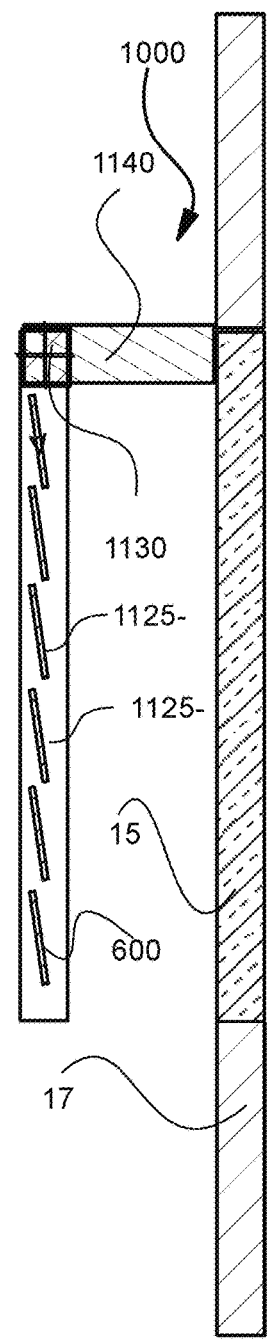

FIG. 7A-C are schematic side elevation views comparing a second and the first embodiment of the invention in which the light re-directing elements 1120− are disposed with negative tilt. As illustrated in FIG. 7A, the laterally projecting stand-off 1140 is supporting the frame 1110 at the vertical center provide a greater negative tilt for the same frame height at a given spacing away from the building 17 than the top frame mounted stand-offs 1140 in other embodiments.

As previously mentioned, another aspect of the inventive device 1000 is illustrated in FIG. 7C (as well as FIG. 10-12) in which a plurality of planar optical light re-directing elements 1120 supported by the frame 1110 are louvers 600. While the frame 1100 is disposed in pivoting engagement with the pivot member 1130 on the end of the stand-off 1140 to rotate about a primary axis 1001, each louver 600 is also operative to rotate about a secondary axis 1002 at the point of the connection to the frame 1110.

In general, the frame 1110 having the array of louvers 600 of FIG. 7C can be rotated out from the building and behave very similar to the solid rotated panel. Deployment of frames 1110 with rotatable louvers 600 as the light re-directing 1124 and transmitting portion 1125 of the optical panel 1120 may have several advantages in particular constructions. The louvers 600 provide some advantages to optimize the capture of light to increase lighting efficiency, while also allowing the captured light to be directed toward the ceiling, where the diffuse scattering provides a more desirable interior ambiance.

One such advantage is that that the frame 1110 need not be rotated so far from the window 15 to capture lights, as the angle of the light re-redirection can be set by a combination of a lower frame rotation and a some rotation of the louvers. In the case of a multi-story building illustrated in FIG. 9, the stand-off 1140' and 1140" can be shorter when the upper frame 1110 rotation is reduced by a contribution from the rotation of the louvers 600, as the lower edges of the frames 1110*b* of the upper stories can have narrower projection away from the building wall 17 that would block sunlight from reaching the optical panel 1120 and transparent portion 1125 in the frames 1110 disposed at windows in the lower stories.

A general optimum range of frame 1110 and/or louver 600 tilt has been discovered for the inventive structure 1000 that provides a beneficial compromise for increasing the efficiency of sun light utilization while avoiding light leakage and other effects that produce undesired glare or internal heating from the infrared components of sunlight. It is generally desired that the re-direction angles of ray 11, for the external structure 1000, to direct light to the center of a ceiling space, range between 12 to 17 degrees. If re-direction is desired further back into a room, the range is approximately 6 to 9 degrees. In such cases, taking into account efficiency over a range of solar elevation angles it is generally preferably to tilt the optical panel 1120 or frame 1110 upward between about 20 to 40 degrees from the vertical orientation, but more preferably from about 25 to 35 degrees.

In the case of the optical panel 1120 deploying as light re-directing components 1124 the parallel spaced apart TIR surface 110*a* and 110*b* in FIG. 14-17, the optimized extent of frame tilt or frame tilt and louver 600 tilt is dependent upon the aspect ratio of the elements 110. When the optical elements 110*a* and 110*b* have a 2:1 aspect ratio (width of face 110*a* divided by vertical height) the efficiency of light utilization is a maximum at a solar elevation is 42 degrees. It has been discovered that the optimal positive rotation of the optical panel 1120 for high sun angles is 25 to 35 degrees for this 2:1 aspect ratio. On the other hand, for low sun angles, the panel 1120 will be tilted from 10 to 30 degrees, negative, and is only limited by the building interference and the acceptable lateral length of the stand-off or brackets 1140.

Further, wind loading on the solid panel 1120 will be higher than that of a louvered panel of the same size, due to the air gaps in between louvers 600 providing channels for air to flow.

In more preferred embodiments the louvers 600 themselves can be independently rotated, relative to each other, for re-directing light over a programmed range to spread the light over a greater width of the ceiling 20 in a building. This benefit is illustrated in FIG. 8, in which ray 11" corresponding to the lowest louver 600 in the external frame 1110 is at a lower elevation angle to penetrate further in the room, scattering off the ceiling 20 as rays 12".

It should be appreciated that disadvantages that may exist or be discussed with some modes of operation or use do not apply to all embodiments. Notably, with respect to the embodiment of FIG. 6, in which the frame 1110 and optical panel 1120 is deployed only in a clerestory position, that is the portion of the window that is above eye level, it is not as important to direct light at steeper angles as the frame swings outward from the building to capture more light. With a light re-directing structure in a clerestory position, any upward re-direction of sun light will avoid directing light into the eyes of a building occupant.

It should also be noted from FIG. 7A-C, that the potential combination of tilting the frame 1110 and the louvers 600 provides the greatest range of negative tilt for a fixed laterally projecting stand-off 1140 while mitigating the straight through leakage of light. In contrast, when the optical panel 1120 is a monolithic transmitting region 1125, as opposed to the assembly of louvers 600 in the frame 1110, the potential for light leakage between louvers on negative rotation is avoided. However, depending on the optical design of the light re-directing elements 1124, straight through leakage for incidence angles below 40 degrees is possible. For example, in the case of the 2:1 aspect ratio of the optical elements 110 of FIG. 14-16 the angle above which there is no leakage is exactly at 42 degrees.

Figure 8A:
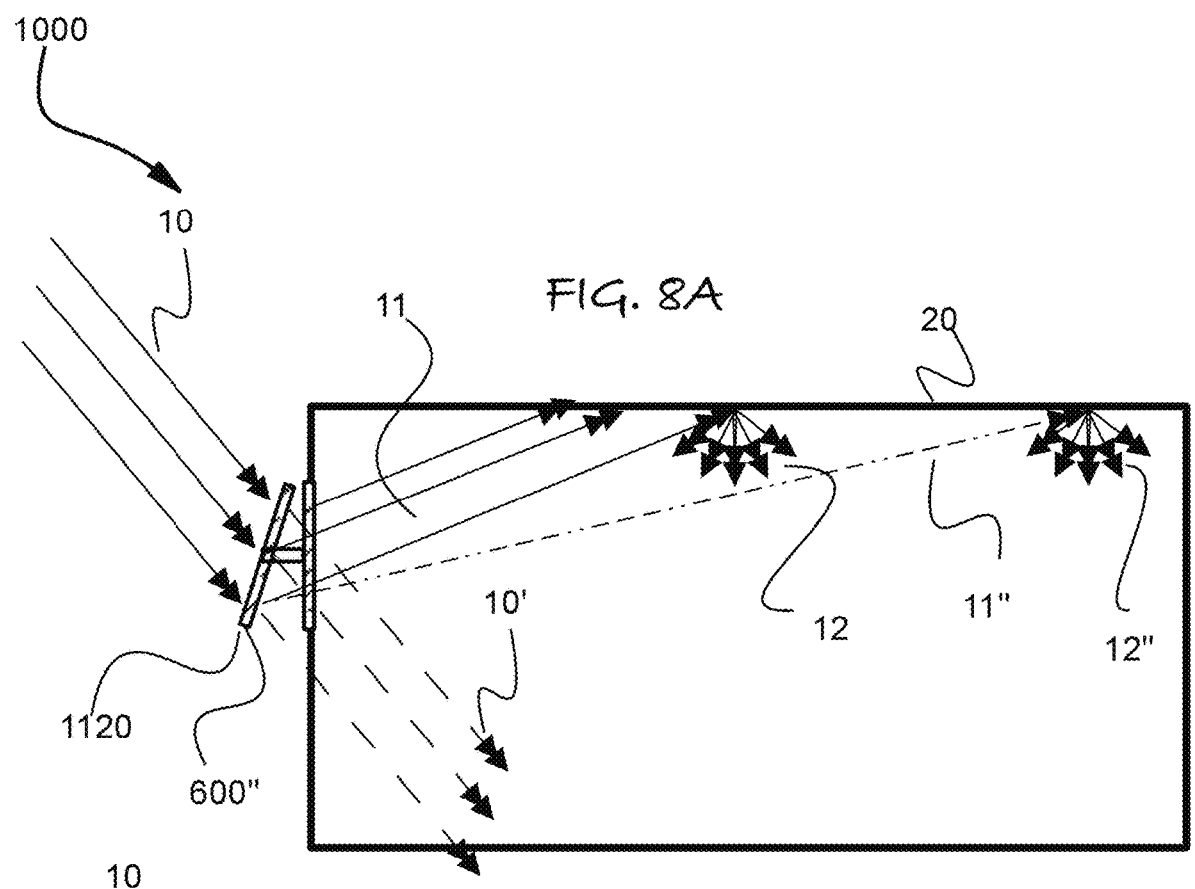
FIGS. 8A and 8B are cross sectional elevation views of the embodiment of FIG. 5-7 that includes ray tracings showing the penetration of the solar radiation into a room.

FIGS. 8A,B and 12 illustrate several aspects of using an external day lighting device 1000 of FIG. 7A to re-direct least some portion of solar light rays 10 incident at higher angles with positive tilt of the frame 1110. FIG. 8 is a cross sectional elevation view of the embodiment of FIG. 12 that includes ray tracings showing the penetration of the solar radiation into a room toward the ceiling 20. Solar radiation incident at high angles from the sun 10 on glazing 15 is re-directed by light re-directing elements 1124 of optical panel 1120 away from the path 10' it would otherwise take in a room toward the floor 5, and re-directed back upward towards the ceiling 20 as ray 11. Thus, incident sunlight, is upon being re-directed, scattered off the ceiling 20 as rays 12, providing occupant farther from a window glazing 15 with diffused natural light. The external light re-directing element can be deployed so different portions thereof are operative to spread the rays 11 across a desired portion of the ceiling 20 width, such as the lower portion of the optical panel 1120, which is optionally a rotatable louver 600" to project rays 11" more distal from the window 15 to be diffused downward as scattered rays 12".

Figure 8B:
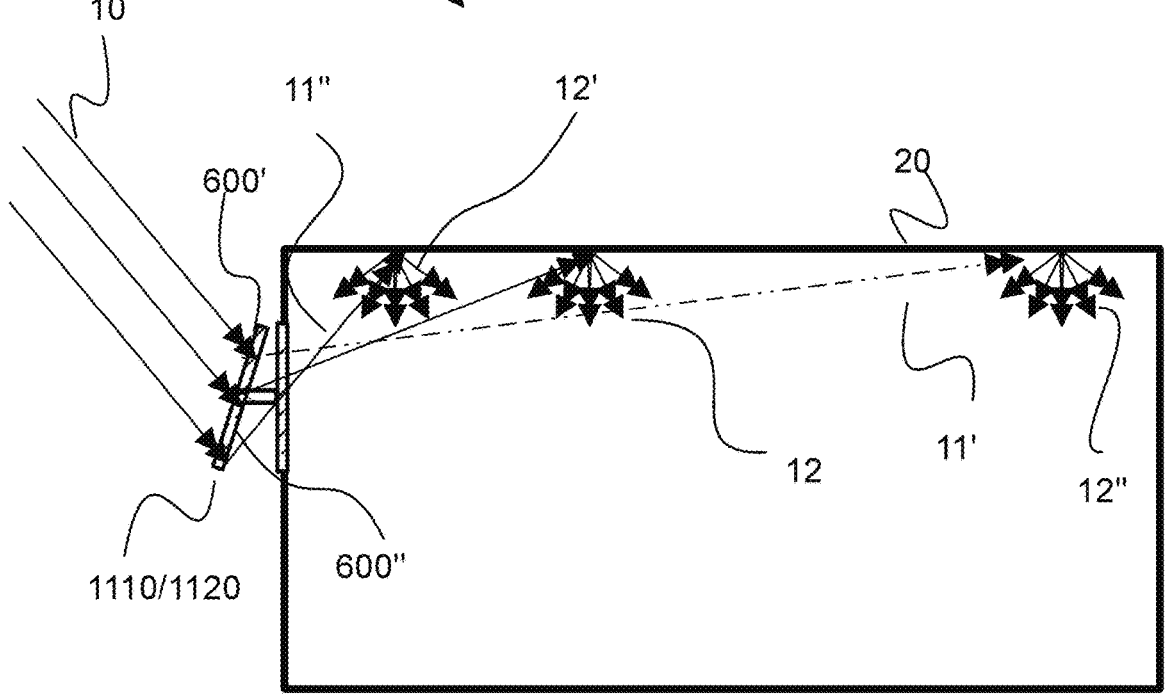

Alternatively as shown in FIG. 8B, the light redirecting element 1124 of panel 1120 can be disposed on a plurality louvers 600 that are selectively rotated to direct the light over a greater width of the ceiling 20 while minimizing the potential for light to be-redirected at the eyes of an inside occupant. Louver 600' is tilted for re-directing light 10 at the top of the frame 1110 toward the rear portion of the room as ray 11', that is the parts of the ceiling 20 most distal from the window 15, and the lowest louver 600" in the frame redirecting the light 10 at the steeper incident angle as ray 11" closer to the window 15, which scatters of the ceiling 20 as diffuse lighting rays 12"

Figure 9:
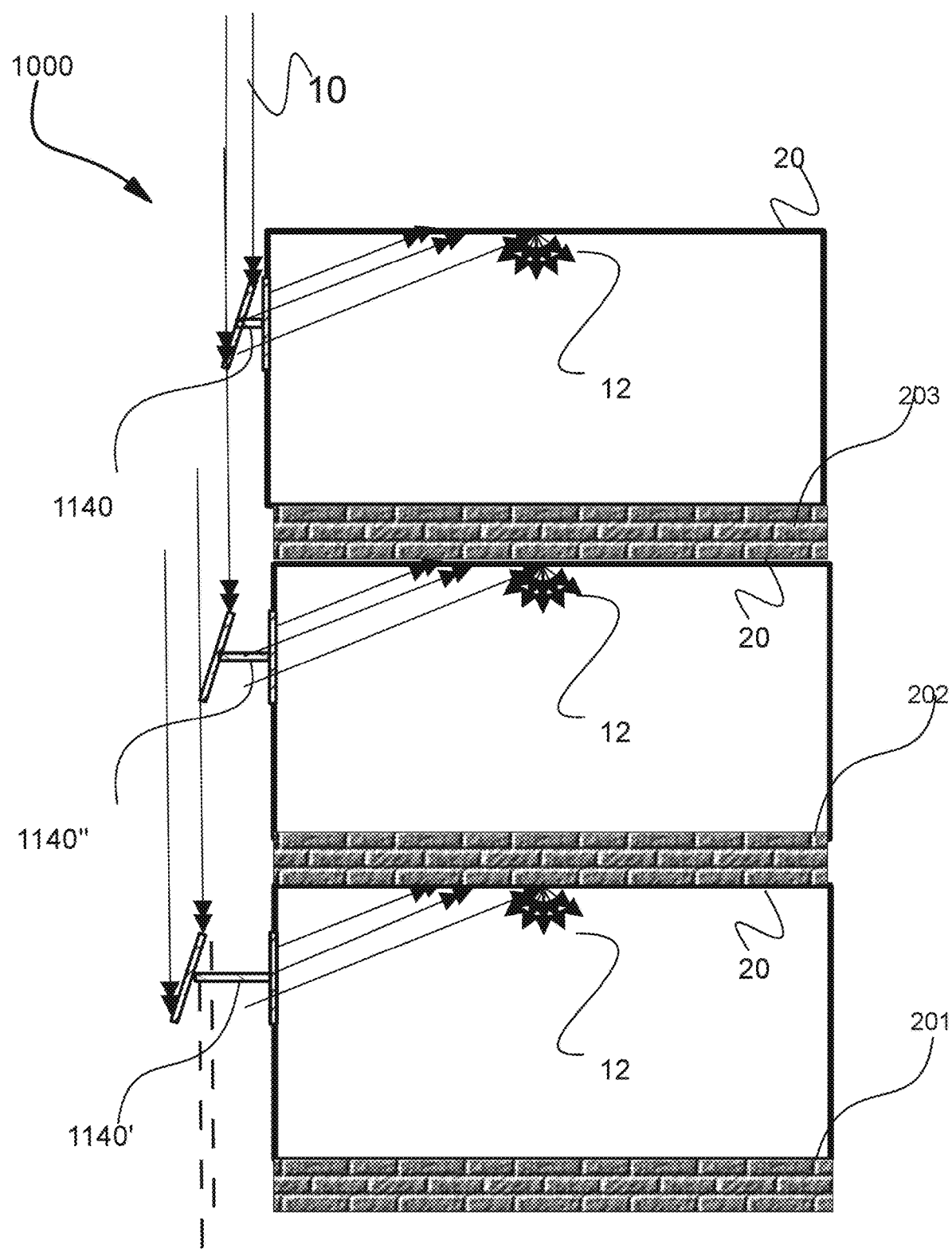
FIG. 9 is a cross sectional elevation view of another embodiment of the invention showing the configurations of the light re-directing frame for multiple floors in a building and includes ray tracings showing the propagation of solar radiation into a room on each of the adjacent floors.

FIG. 9 is a cross sectional elevation view of another embodiment of the invention showing the configurations of the optical panel 1120 on stand-offs or brackets 1140, 1140' and 1140" respectively for multiple floors 201, 202 and 203 in a building. FIG. 9 also includes ray tracings showing the propagation of direct downward solar radiation 10 into a room on each of the adjacent floors, which scatters off the ceiling as rays 12. Each laterally projecting stand-off 1140 at successively lower floors extends farther away from the building wall 17 to capture nearly vertical sunlight thus avoiding the effective shadowing caused by each of the upper devices 1000. The lateral extension of the lowest standoff 1140" is sufficiently larger than the previous standoff 1140' to account for the forward projection of the lower edge of the frame 1140' and the optical redirecting structure 1120 thereof. When the standoff 1140 is mounted to the vertical center of the frame 1140', each successively lower standoff needs to extend outward further to account for the rear ward projection of the top of the frame 1110.

Figure 10:
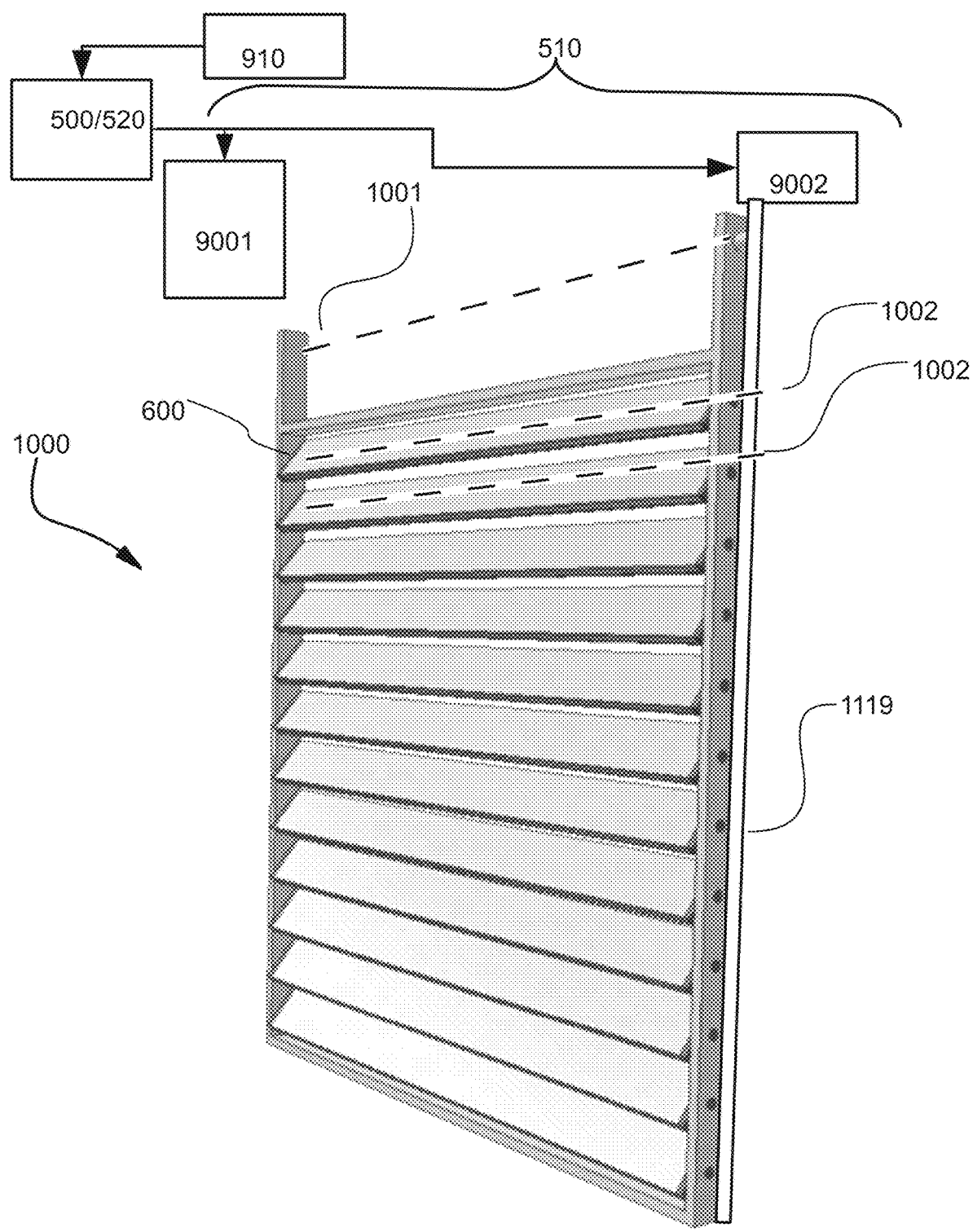
FIG. 10 is a schematic perspective view of another embodiment of the invention showing a control and actuation system for titling the frame in response to the solar elevation.
Figure 12:
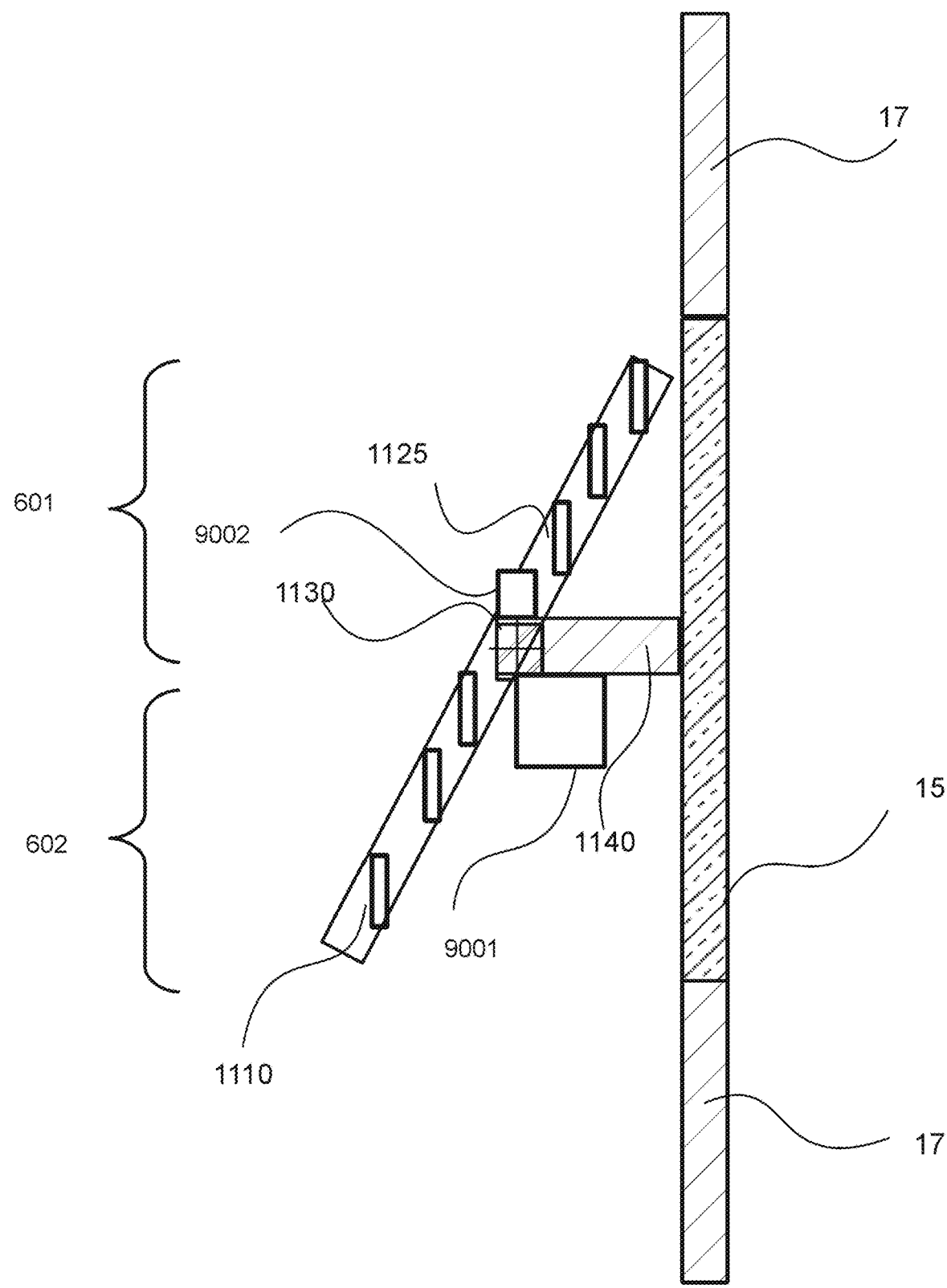
FIG. 12 is a schematic perspective view of another embodiment of the invention showing a control and actuation system for tilting the frame in response to the solar elevation.

FIGS. 10 and 12 illustrate additional embodiments of the invention that deploy louvers 600. The frame 1110 is supporting a plurality of planar light redirecting elements 1124 of louvers 600 disposed in pivoting engagement with the frame 1110 to rotate about a primary axis 1001, with each louver 600 being operative to rotate about a secondary axis 1002 at the point of the connection to the frame.

FIG. 10 is a schematic perspective view of another embodiment of the invention in which the frame 1110 deploys tiltable louvers 600, in which a first actuator 9001 is controlled to pivot the frame 1110 in response to solar elevation or day, date and latitude. A second actuator 9002 is deployed to control louver 600 tilt within the frame 1100. All of the louvers 600 may be coupled to a common control bar 1119, which connects to a side portion of the louver distal to the axial connection 1002. The movement of control bar 1119 by the actuator 900 rotates each louver 600. The actuator can be any form of a motor, such as a stepper motor. The first and second actuator 9001 and 9002 are responsive to a controller 520 to change orientation in response to the changing solar elevation through the day during the entire year. The solar elevation is determined by a module 910. Module 910 can be operative to determine the solar elevation by actual measurement or by calculation. For example, solar tracking is optionally by calculation from time of day, window orientation, latitude and date, or by an optical system with position sensitive detectors, that measure the actual solar elevation and azimuth and/or or by movement of frame and/or louver via the coupled actuators to optimize total light through-put from one or more remote detectors or a sampling detector that is illuminated by an additional optical element that is attached to move with the frame and/or louver(s). It is anticipated that the controller or module are a microprocessor or receive commands based on calculations from a microprocessor that is connected by a wired or wireless connection, such as a smartphone or tablet computer device.

Figure 11:
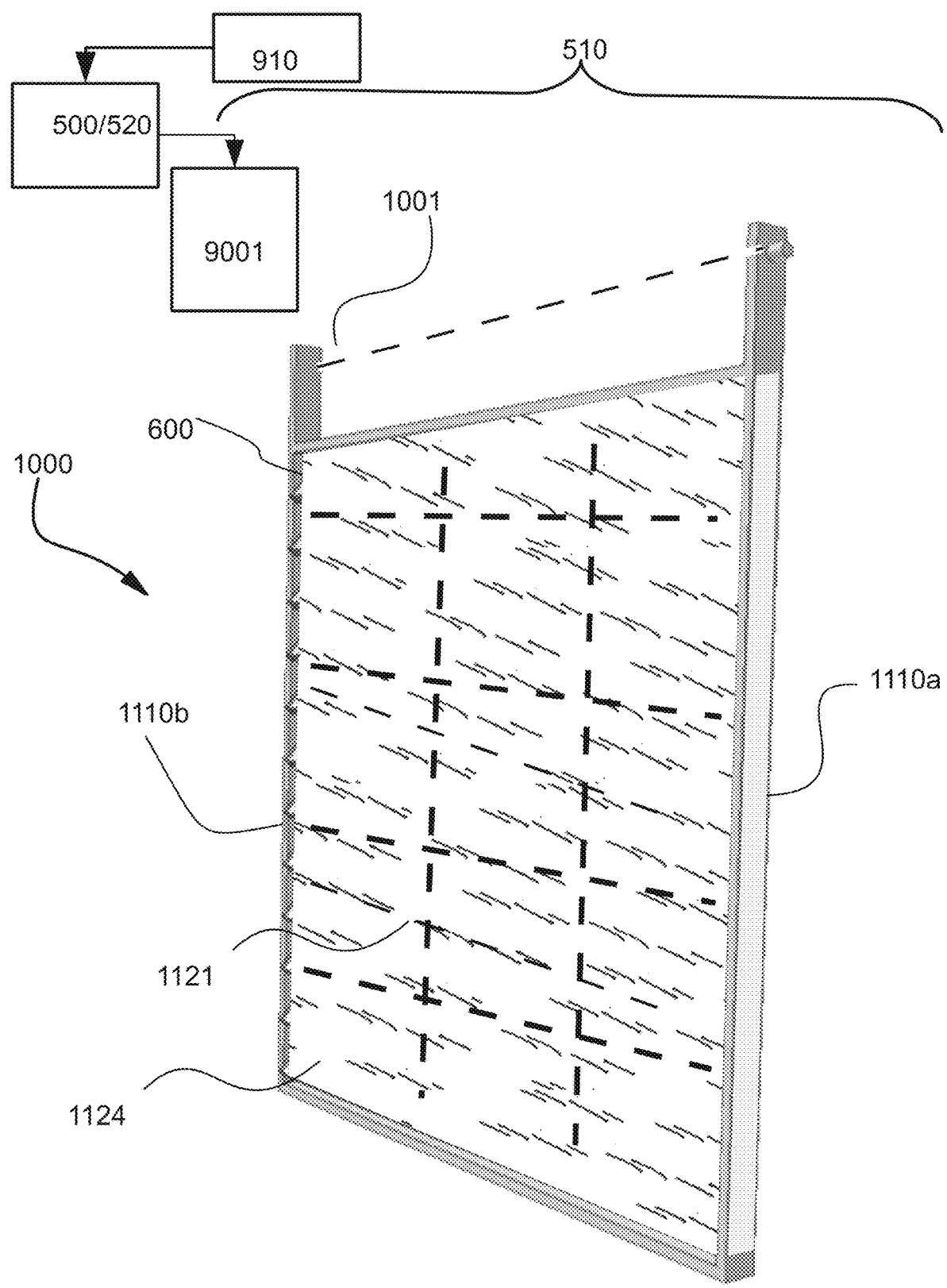
FIG. 11 is a schematic perspective view of another embodiment of the invention showing a control and actuation system for tilting the frame in response to the solar elevation.

FIG. 11 illustrates the frame 1110 supporting a rigid and optionally monolithic panel 1200 or panel formed of tiles 1121 in which the frame 1110 is tilted by an actuator 9001 in response to solar elevation or day, date and latitude as described with respect to FIG. 10.

FIG. 12 illustrates a frame 1110 as mounted to a building structure as in FIG. 7A, but showing the first and second actuator 9001 and 9002 are responsive to a controller 520 to change orientation in response to the changing solar elevation through the day and yearly cycles. The first actuator 9001 is mounted on the stand-off 1140 adjacent pivot hinge 1130, whereas second actuator 9002 is mounted on the frame 1110 to couple to a first sub-set of louvers 601 above the pivot axle 1130, and a second sub-set of louvers 602 disposed below the first sub-set of louvers 601

Figure 13:
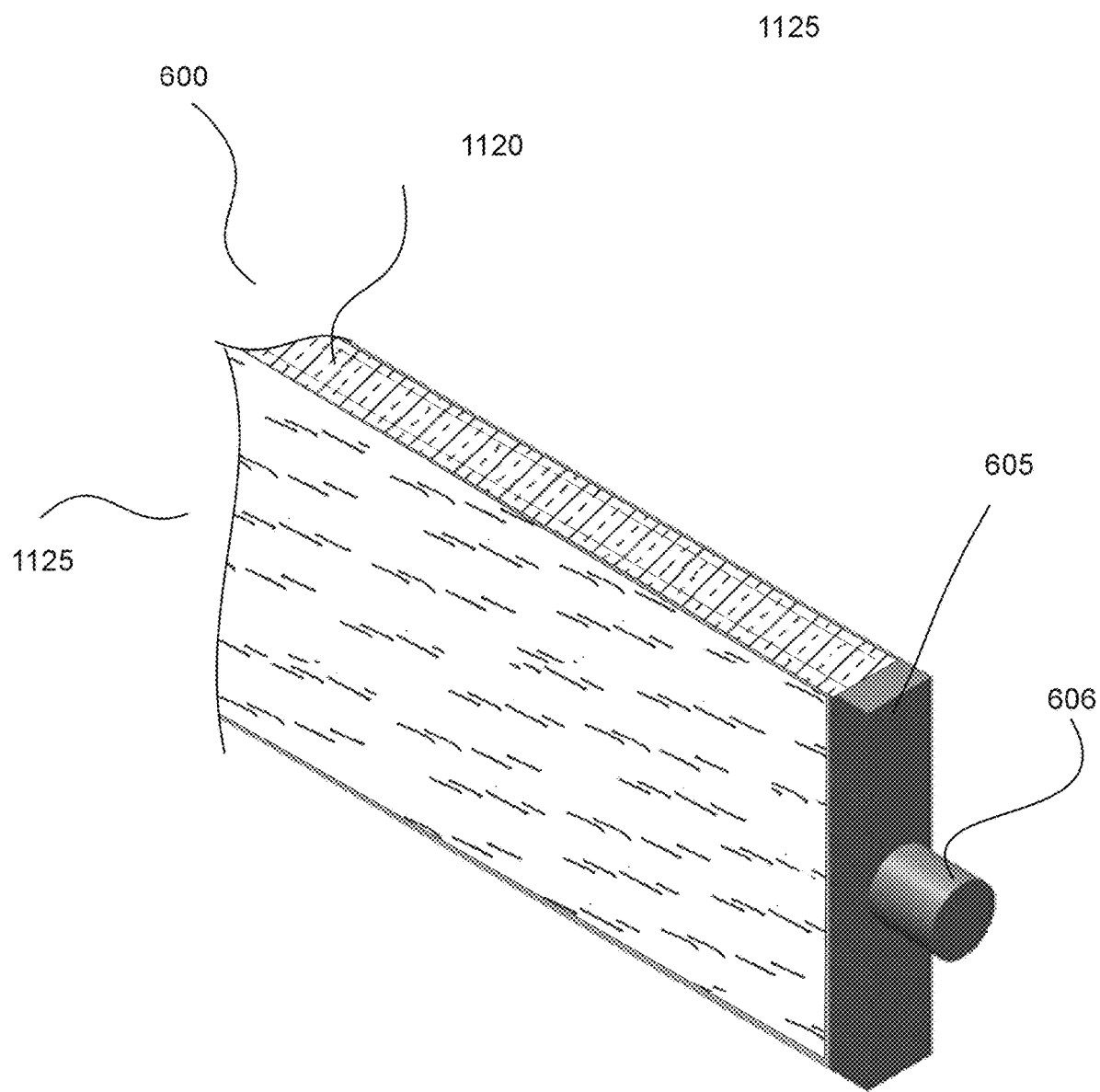
FIG. 13 is perspective view of a portion of a tiltable louver.

As illustrated in perspective view in FIG. 13, one embodiment of the louver or slat 600 is transparent rigid planar support surface in a rectangular shape having opposing faces, and a set of orthogonal front and rear faces and left and right sides, in which the faces are longer than the side. The edge of the louver 600 can be coupled to end cap 605, and each of the two opposing end caps 605 preferably has an axles 606 that engages the frame 1110 to provide a means for tilting the louver 600. The end cap 606 may provide other projections that enable the tilting about the axis of axle 606. The front face of the louver 600 is the light transmitting portion 1125, whereas light re-directing portion 1120 is preferably internal. The rear face, opposite the front face is also light transmitting. However, in certain construction of the slat or louver 600 the rear face can be a portion of the light re-directing structure 1120, such as in the embodiments of FIGS. 18B, 19 and 20A-C.

Figure 14:
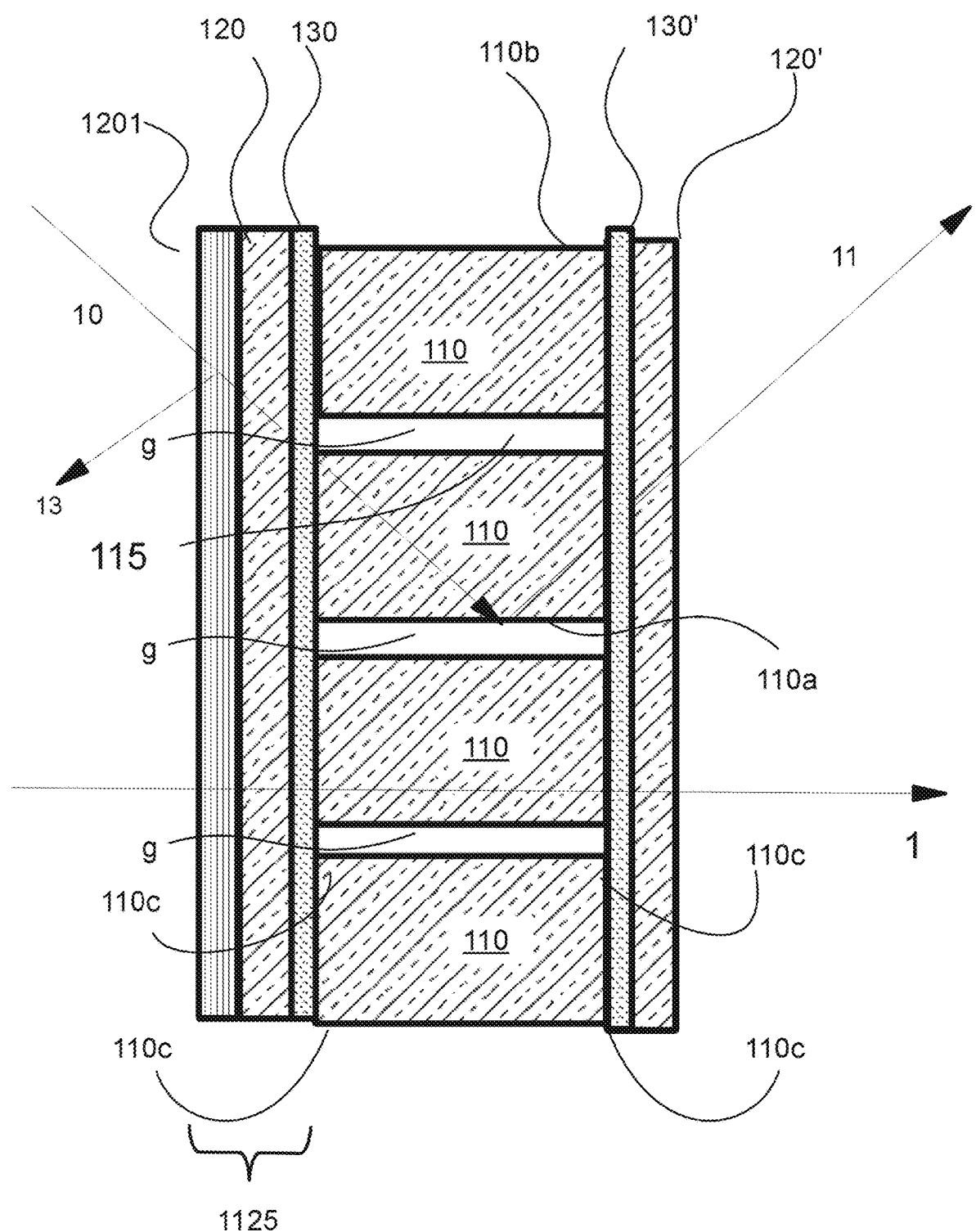
FIG. 14 is a cross-sectional elevation of a portion of an alternative embodiment of the louver in FIG. 12.

FIG. 14 is a schematic cross-sectional elevation of a first preferred embodiment of a light re-directing structure 1120 in a louver panel 600 of FIG. 13, which deploy macro spaced TIR surfaces, which preferably have a small radius of curvature at the corners to minimize glare. TIR surface 110$a$ and 110$b$ are on opposing sides of the optical elements 110, which have four corners 110$c$, with the TIR surface being defined by the gap, g, between each adjacent optical element 110. The optical elements 110 are preferably attached with adhesive layers 130 and 130' to an optical quality transparent substrate and superstrate 120 and 120'. The pitch between gaps is preferably about 0.5 mm or greater. The aspect ratio of the optical elements is selected to avoid leakage that is rays traveling at too shallow an angle to impinge on the surface 110$a$ for TIR, depending on the anticipated range of exposure angles to the sun, as well as to avoid double reflections. A useful compromise in the application with the tilting frame 110 is between about 1.7 to 3, and more preferably about 1.8 to 2.2 and most preferably about 2.

Preferably, the substrate and superstrate 120 and 120' have the same thickness to create a vertically symmetric structure to preclude distortion from thermal expansion. Glare is minimized by deploying optical elements 110 with a pitch between elements 110 of at least about 0.5 mm, and more preferably greater than 1 mm, with corners 110$c$ having a radius of curvature of less than 2% of the optical element spacing or pitch, that is the element width plus the thickness of the gap 115, and more preferably less than 1.0% of the element spacing or pitch, but most preferably less than 0.5% of the element spacing or pitch. Alternatively, in the embodiment deploying parallel sided optical elements 110 at least some of the otherwise TIR provided by gap 115 can be metalized and need not depend on the gap to provide reflection.

It should be appreciated that other light re-directing structure that operate by total internal reflection, such as those illustrated in FIG. 18-21B also benefit by having the preferred and more preferred ranges of pitch. When the pitch between the closest spaced apart light re-directing optical surface is greater than 0.5 mm, and more preferably 1.0 mm, column glare is substantially reduced or eliminated. In particular it should be noted that the light re-directing structure of FIG. 15 to 21B all have some faceted surfaces that are disposed at an oblique angle with respect to the planar optical panel 1120, but may also have some planar regions between these faceted surfaces, such as in FIGS. 19 and 18A and B. However, the light redirecting structure in FIG. 20A-20B also include relatively wide planar regions 1129, that is for example greater than about 1 mm, but more preferably about 3-15 mm, and are separated by faceted regions 1127. The bands of faceted regions 1127 without some intervening bands of planar region between each facet will generally not provide see-through visibility, however when the wider planar regions are as little as about 3-5% of the total area (of the planar bands and faceted bands lacking planar regions), then a useful level of see through visibility can be achieved. Such see-through visibility is helpful for persons residing inside the structure to resolve the shape and placement of objects in the exterior environment, such as trees, buildings, vehicles, hills, mountains, clouds and the like. It should be appreciated that the bands of planar see-through regions 1126 are wider than the spacing of adjacent light redirect elements, such as the facets in the light re-directing regions 1127. The light redirecting regions 1127, are preferably transparent and re-direct light by total internal reflection, such as off tilted facets or surfaces like 110a in FIG. 14 that are parallel to the adjacent surface 110b, and transverse to the front of panel 1120.

The optical panels 1120 or louvers 600 that deploy the optical structure on the face of film 1128 is more preferred over other embodiments because it can be produced in the form of larger panels, tiles, slats or high aspect ratio louvers using conventional metal molds that do not required diamond machining. Such molds can be used in high rate production processes, such as compression and injection molding, and can have a long useful life. Further, when the planar regions 1125' are 2-20 mm wide it is easier to achieve some optical absorption by painting tinted coating on then or patterns of smaller opaque dark dots, such as by silk screening. A none limiting example of a preferred embodiment of the optical panel 1120 in FIGS. 20A and B and 21B would be the planar regions 1125' being a band with a width of about 1 mm and the non-planar or faceted regions 1127 being a band with a width of about 11 mm, for a total pitch of 11 mm, and about 9% of the area being planar bands 1125'.

When the panels 1120 have some optical absorption it is preferable in many situation to provide total transmission of from about 50 to 90%, with the highest transmission being about 92% when Fresnel reflections from the front and back surface are accounted for.

It should be noted that another benefit of rotating the frame and the louvers is that the frame rotation captures more light, but in the case of rectangular optical elements 110 of FIG. 14-17 which provide see-through visibility (in the direction of arrow 1 as will be described in further detail below) the louvers 600 can then be tilted so that the TIR surfaces 110a are disposed closer to lateral to optimize see through visibility for a viewer looking outward in the direction normal to the glazing surface 15.

As is also illustrated in FIG. 14-19, in a more preferred embodiment of the invention either the optical panel 1120, tiles 1121 or the louvers 600 have an external or internal Infrared light (IR) reflective member, which is optionally an IR reflective coating 1201. The IR reflecting layer is preferably a multi-layer thin film coating 1201 that reflects IR light (illustrated as reflected ray 13) and transmit visual light ray 10 into the optical elements 110, in which the TIR re-directed visible light exits as reflected ray 11 toward the plane of the pivot mounts (i.e. toward the window 15 or building wall 17) to be scattered off the ceiling 20. The lamination of the substrate 120 and optical adhesive 130, along with the multi-layer thin film coating 1201 forms the light transmitting portion 1125. The IR reflecting material can be monolithic, or any of the multi-layered films are optionally metal and/or dielectric mirrors, or IR reflecting coatings 1201 are disclosed in, among others, the following US Patents and published US patent applications: US2010/0132756A1; U.S. Pat. Nos. 7,709,095B2; 7,508,586B2; 8,728,636B2; 8,404,303B2; 7,824,777B2 and 7,964,285B2, which are incorporated herein by reference.

Further, a more preferred embodiment of the louvers 600 confers additional benefits. In particular, with respect to the embodiment of FIG. 15-17 a black absorbing layer 405 is provided on a surface 110b of each optical element 110. While the layer 405 will not interfere with see through visibility of louvers 600 in a direction parallel to surface 110a and 110b (ray 1), any rays of light incident on layer 405 will be absorbed. In normal use (FIG. 15-16), the louvers 600 are rotated so that layer 405 of each optical element 110 is disposed on the upper face. As the TIR of incident sunlight occurs on the opposing or lower surface, the absorbing layer 405 only absorbs visible light at high azimuthal angles that would undergo a second reflection. Even if the louvers 600 are moderately tilted the absorbing layer will be a small fraction of the lateral projected area and not interfere with visibility of external objects to viewers inside the building. However, in a preferred embodiment the louvers 600 are rotated 180 degrees, as shown in FIG. 17, the sunlight is absorbed and not re-directed into the interior. This is like turning the light off, although see-through function will be maintained.

Figure 15:
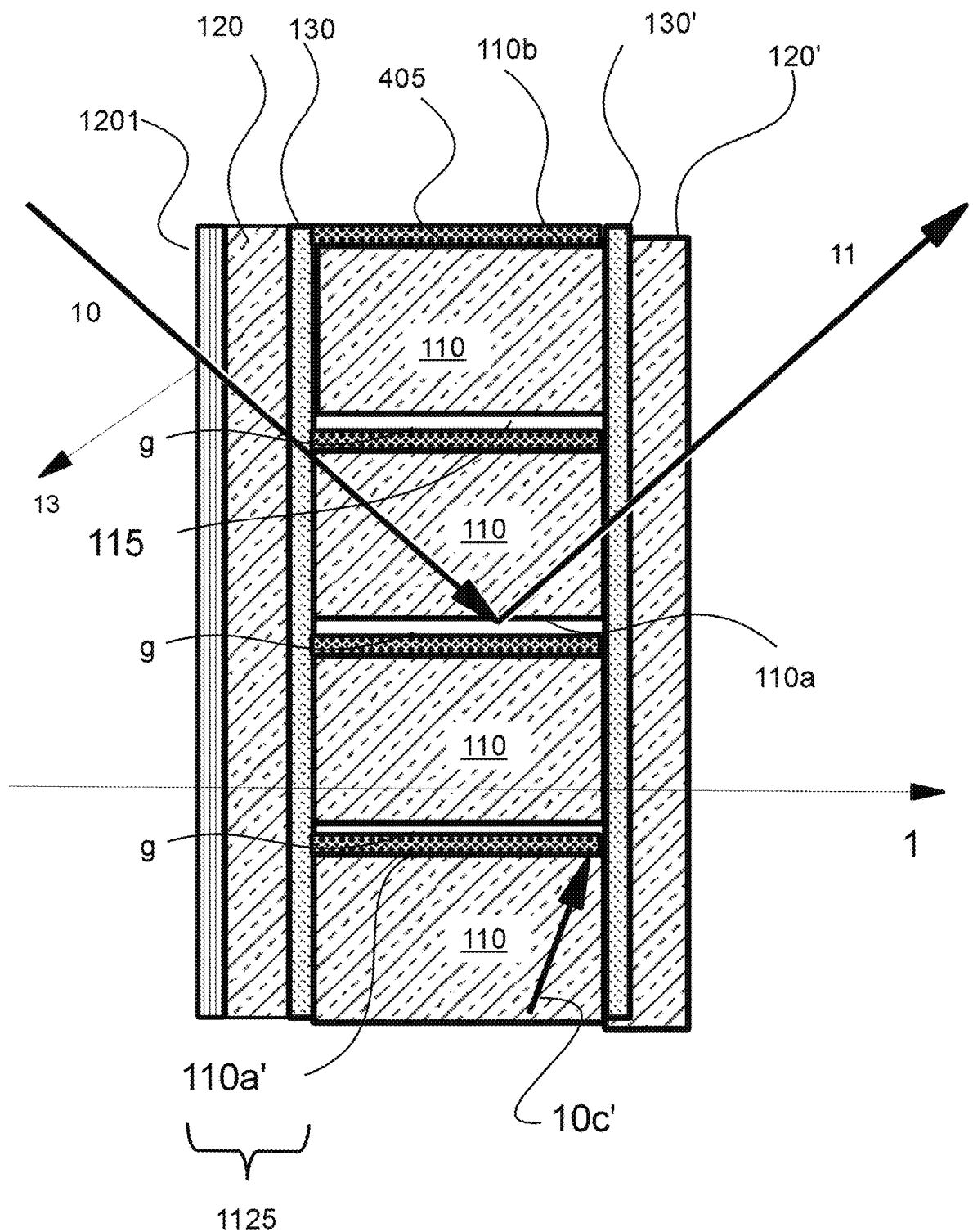
FIG. 15 is a cross-sectional elevation of a portion of another alternative embodiment of the louver in FIG. 12.

FIG. 15 is a schematic cross-sectional elevation of an alternative embodiment of a light re-directing structure in a louver panel 600 of FIG. 11 deploying macro optical elements 110 with alternating blackened faces 110b formed by coating or depositing an absorbing layer 405 thereon to provide asymmetrical light re-direction. blackened faces 110b are disposed below the opposing face 110a of each optical element 110, so that any potential multiple reflections (illustrated as ray segment 10c' in FIG. 15) are absorbed, and do not cause glare from rays that would otherwise be re-directed back in the same direction as incident solar rays 10, that is back down toward the interior floor.

FIG. 16 illustrates a more preferred embodiment of louvers 600 with the alternating absorbing layers 405 on adjacent optical elements. The IR reflecting layers 1205 and 1205' are disposed on both sides of the louver 600 so that IR radiation is reflected away from the building in both the conventional orientation of FIG. 16-17, and the absorbing inverted orientation of FIG. 18.

Another benefit of tilting the louvers 600 is to position the IR rejecting coating 1201 at the optimum angle for IR reflectivity, albeit at a potential compromise in the efficiency or location of light re-direction within the room. However, It should be appreciated the multi-layer thin film coating 1201 can be tuned to have optimum efficiency at a given IR wavelength and more specifically, over the prominent wavelengths of solar IR emission, at a particular range of angle of incidence, to optionally correspond with the optimum for light re-direction.

It should be noted that the substrate for the IR reflective coatings 1201 is optionally disposed on flexible film 120 having an optical quality adhesive 130 on the opposing sides. Alternatively, the substrate 120 for the IR reflective coatings 1201 can be rigid or flexible materials, such as glass or plastic plate or sheets. Preferably, the multi-layer IR reflective coating 1201 is disposed on at least one of the substrate and superstrate 120 and 120', with the IR reflective coating side attached with adhesive layers 130 and 130' respectively to the optical elements 110.

Further, various embodiments may also provide exterior glazing protection in storms or high winds, such as by deploying impact resistant plastic panels or louvers when the frame is tilted to the window and louvers are vertical. Multilayer polymer films that are IR reflectors are known, and polymeric substrates, such as polyester films, can be coated with thin film multi-layer coatings 1201 to provide impact resistant plastic for the optical panels 1120 and/or louvers 600.

Figures 16A, 16B:
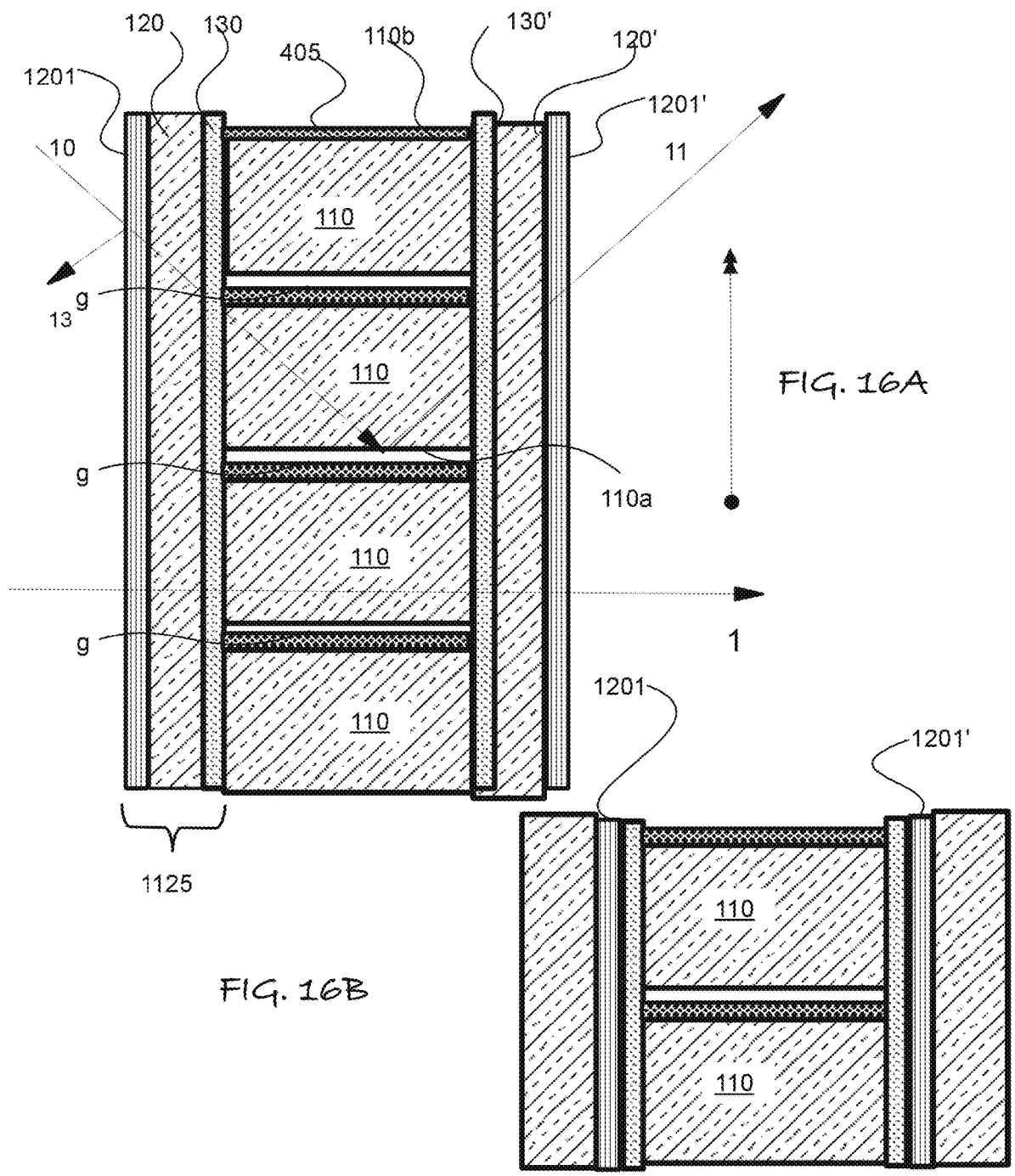
FIGS. 16A and 16B are schematic cross-sectional elevation view of portions of alternative embodiment of the louver in FIG. 1.
Figure 17:
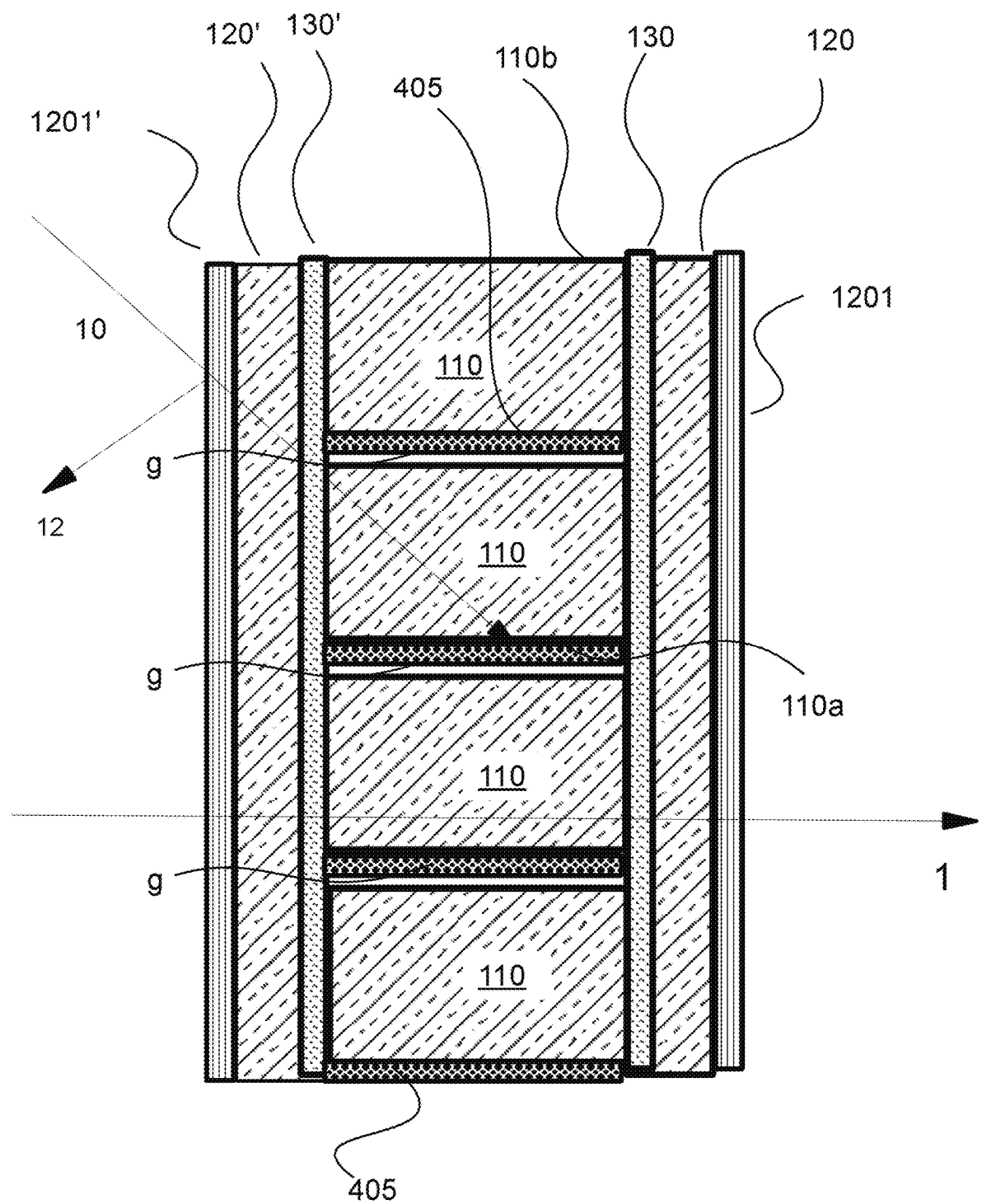
FIG. 17 is the cross-sectional elevations of the portion of the alternative embodiment of the louver assembly of FIG. 16 when inverted in the frame to block the visible and IR components of sunlight, while still allowing see-through visibility from the inside of the building.
Figure 18:
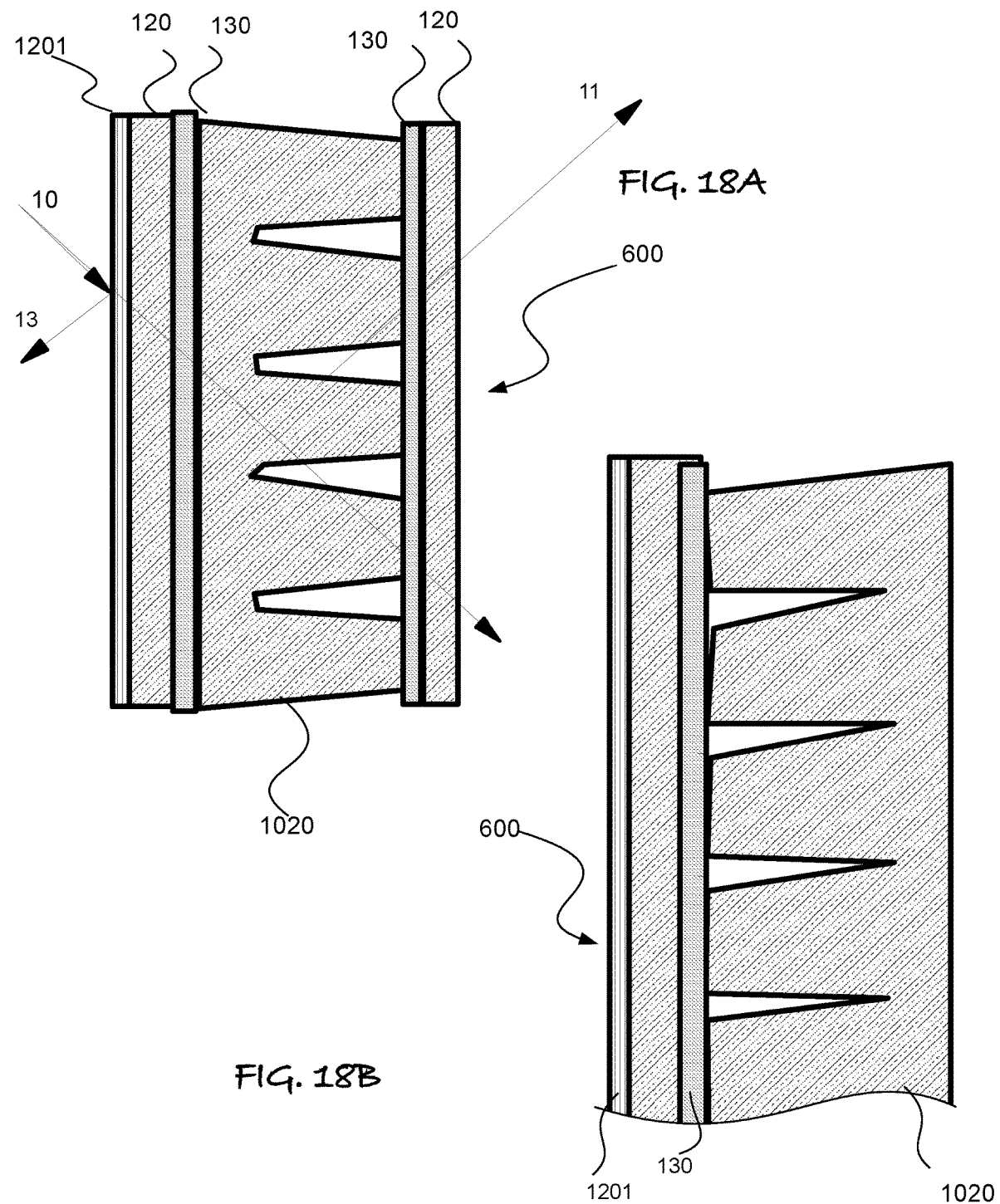
FIGS. 18A and 18B are cross-sectional elevations of a portion of the alternative embodiment of the louver.

FIG. 16A-17 illustrate methods of using a more preferred embodiment of the louver 600 of FIG. 16A or FIG. 16B as orientated in FIG. 15. In FIG. 17, the louvers 600 are rotated through 180 degrees with respect to FIG. 15. In the orientation of FIG. 17, high angle sunlight is absorbed by layers 405, but light from low angles to the glazing (that is closer to the surface normal to the glazing) whether diffuse or directional, enters the structure so the inhabitants have the benefit of being able to see through the building exterior via the windows 15, and can thus visualize the external view of the surroundings. The IR reflecting coating 1201 and 1201' are on opposing faces of the louver 600 in FIGS. 16A and 16B so that IR radiation is reflected in either orientation. That is, when the louvers are inverted, the IR radiation is reflected before entering the portion of the louver with the spaced apart reflective surface. When the louvers are upright and the frame is pivoted to optimize the amount of sunlight that enters the structure, the other IR reflecting coating or layers are operative to reflect the IR radiation before it enter the portion of the louver with the spaced apart reflective surface. It should also be noted that in FIG. 16A, the IR reflector layer 1201 and 1201' can be on substrates that are laminated with the optical adhesive 130 and 130' between the substrates 120 and 120' to opposing sides of the optical elements 110. The spaced apart IR reflector layer 1201 and 1201' can be on substrates that are laminated or otherwise attached to any other light re-redirecting structure disclosed in this application, or known in the prior art. This can be achieved in the form of optical panels, tiles that form panels or louvers by laminating an optical re-directing film to a panel of for example tempered glass or rigid plastic or laminated glass having an IR reflective coating, and then laminated either another panel of tempered glass having an IR reflective coating, as well as a flexible transparent film having such an IR reflective coating. The tempered glass or laminated glass would provide the rigidity of the optical panel, while the laminated light re-directing and IR reflective films can provide additional strength by safely holding any form of glass together should it break.

The embodiments of FIG. 16A-17 can also be provided without the IR rejecting layers, such as for example when building windows 15 already have IR reflecting coating or layers. It should be appreciated that the embodiments of FIG. 16A-17 can also be deployed to avoid the need for the glass window 15 to use such an IR reflecting layer or structure, and reduce costs. This is particular the case as shown in FIG. 6 when optical panel 1120 and frame are used only in the upper or clerestory portion 15*u* of the window 15. As this smaller optical panel 1120 may in some locations be sufficient to reject a sufficient amount of IR radiation, this may avoid the need to use IR reflective material or as a component of the floor to ceiling window 15.

FIGS. 18A and 18B illustrate an alternative embodiment of the louver 600 or panel 1120 that is supported directly by the frame 1110 that deploys a light re-directing structure 1020 with grooves to form TIR surfaces. The efficiency is limited by the groove width required for fabrication. The structure 1020 is laminated to a support 120 having either an external or internal IR reflecting coating 1201.

Figure 19:
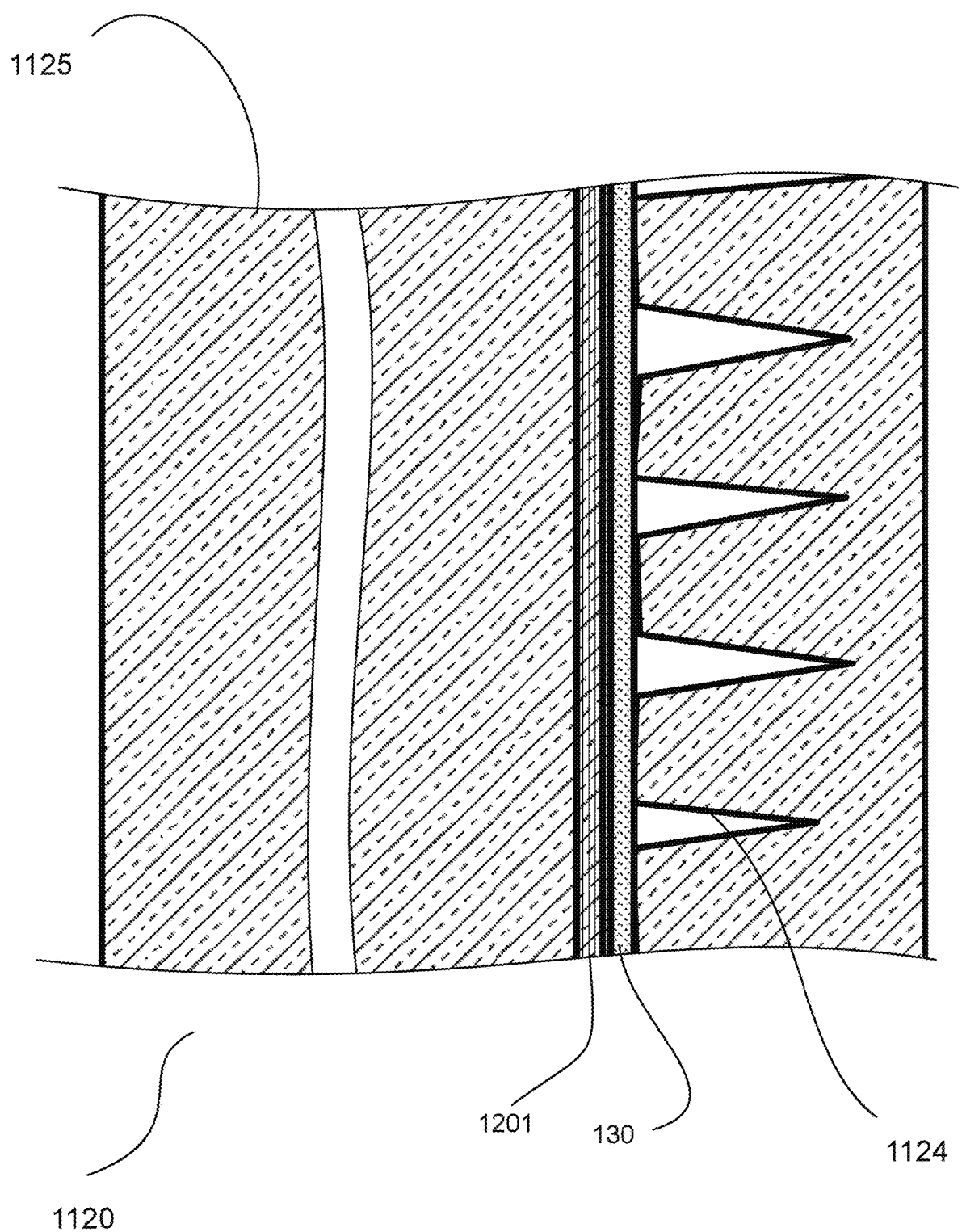
FIG. 19 is a cross-sectional elevation view of an alternative embodiment of an optical re-directing element supported by the frame

FIG. 19 illustrates another embodiment of the invention in which planar light transmitting member panel 1120 has one light transmitting portion 1125 optionally a relatively thick rigid glass or plastic pane having the IR reflecting coating 1201 on an internal surface being attached to the light re-directing member 1120. The structure of any of the embodiments that can be used to form full panels 1120 and an assembly of smaller tile panels that are supported by frame 1110, but can also be used to provide rotatable louvers 600. The light redirecting portion of panel 1120 can be the high efficiency see-through assemblies of FIG. 14-17, or the other light re-directing structures with angled groove of FIG. 18A-19. The IR reflecting coating 1201 can be laminated internally as shown in FIG. 19 in which the coating 1201 is on a rigid panel or louver slat 600 and the 1120 is attached to the IR reflecting coating 1201 with a transparent or partially absorbing pressure sensitive adhesive.

FIG. 20A-21B illustrate alternative preferred embodiments of an optical panel 1120 (or louver 600) in which a light transmitting member 1125 region has an alternating patterns or bands of see-through or visible plano portions 1125' of width Wp with bands 1127 of intervening light re-directing elements 1124 that have mainly facets 2025 and grooved 1125 or are otherwise prismatic, and hence do not provide see through visibility of the exterior to inhabitants of the structure. The facets can be disposed at various oblique angles to the plain of the regions 1125'. These bands 1127 of the facets 2025 have a width Wg. The ratio of height or area of the grooved/plano bands is preferably greater than one, and more preferably greater than 2/1, and most preferably can be higher than 10/1, such as 20/1 or 25/1. The spacing or pitch of the plano elements 1125' can be varied to provide an optimum see through visibility appropriate to the ratio of the grooved/plano elements. Generally the plano areas 1125' may have a width that is at least about 1 mm, but less than about 25 mm. As the plano portions 1125' provide see through visibility, and optionally have reduced visible light transmission (relative to the grooved or prismatic elements 1120) to avoid the strong glare of direct sunlight, such as in early morning or late afternoon hours at east and west facing orientations. The transmission in the plano area 1125' can be controlled by an area of continuous optical density or by a printed pattern array 1129 of opaque or partially transparent material, to provide between about 92% and ~1% total transmission. The transmission is more preferably 90% to 30% and most preferably between about 90% to about 50% transmission. It may be more desirable to provide reduced transmission of the plano regions 1125' when extraneously external objects are likely to redirect sunlight directly through them, such as reflections off metallic structures, traffic signs or signals and water. However, depending on the width or pitch of the non-planar light re-directing regions 1127, relative to the width of the plano regions 1125', if the non-planar regions 1127 provide no light absorption, then it may be desirable to further decrease the total transmission of the plano regions 1125 to between about 10% to 70%.

Figure 20A:
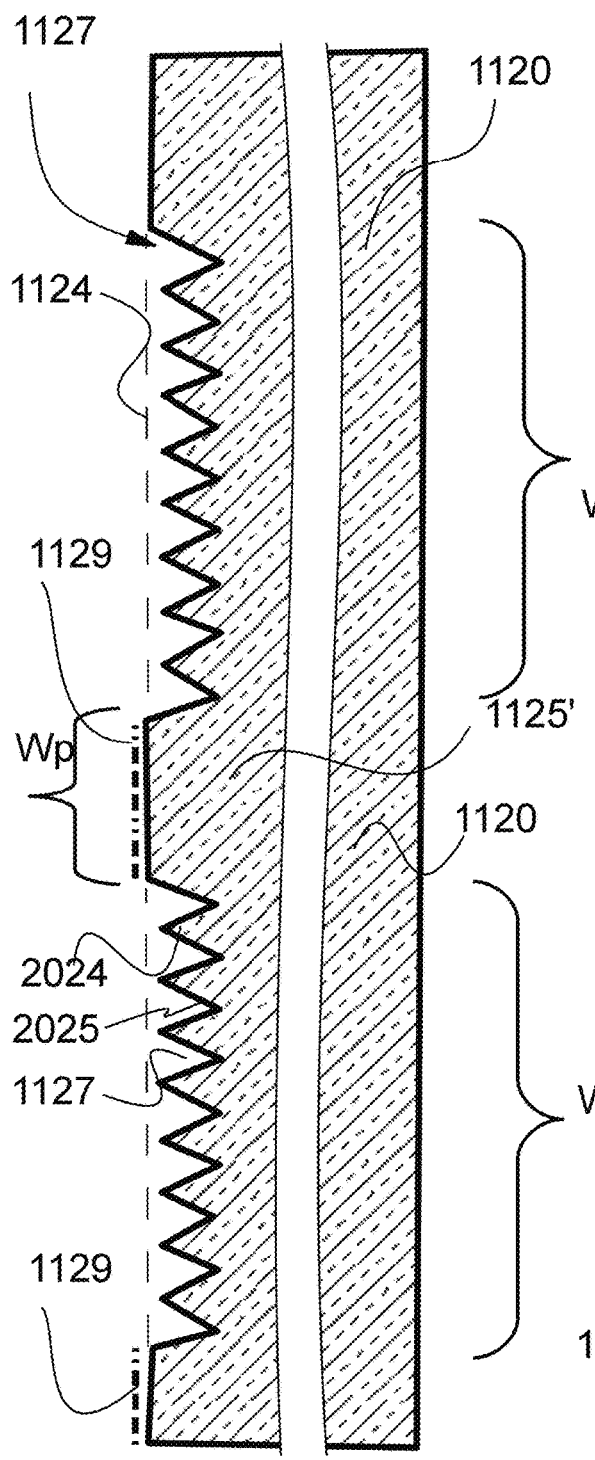
FIGS. 20A and 20B are front and side elevation view of an alternative embodiment of a louver or panel.
Figure 20B:
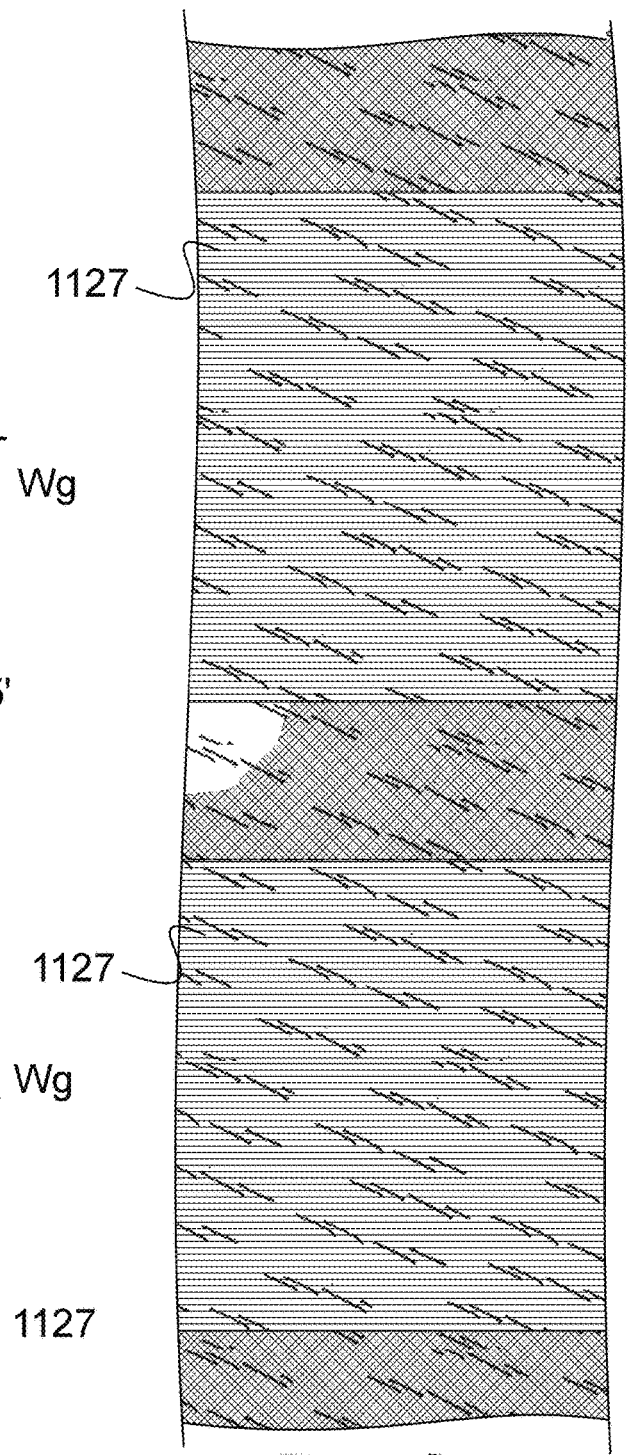

FIG. 20A-B also schematically illustrate an optical light redirecting elements 1124 that can have a sufficient thickness to be self supporting and comprise the optical panel 1120. It should be appreciated that optical properties of the simple optical panel 1120 with transmitting region 1125' in FIG. 20A-B can be achieved as shown in FIG. 21A by laminating the strips or tapes prismatic or grooved material 2124 to a rigid transmitting substrate 1125, such as tempered glass with gaps 2125 between them. Alternatively, as shown in FIG. 21B, the optical properties can be obtained by laminating a prefabricated film 2127 onto a substantially equivalent expanse such a light transmitting substrate 1125. The prefabricated film 2127 with the same structure non-plano optical structure of the embodiment of FIG. 20A that also has wide plano region 1125' separated from the light redirecting region 1127 having the facets 2025 and grooves 2024 as light redirecting elements 1124. The grooves 2024 defined by adjacent facets 2025 in the embodiment of FIG. 20A-B, FIGS. 21A and 21B can have any spacing, but a spacing of greater than about 0.5 mm is preferred to avoid glare and simplify fabrication. Alternatively, louvers 600 can have light re-directing structures 1124 of the optical panel 1120 in FIG. 20A-B or 21A and 21B. It should be appreciated that an alternative embodiment may also include the IR rejecting coating or elements 1201, or equivalent, which is shown in FIG. 21B as being disposed between the substrate 1125 and the prefabricated film 1128. The plano areas 1125' (FIG. 20A or FIG. 21B) are preferably raised above the peak of the facets that define the grooves for lamination to the substrate 1125 as shown in FIG. 20B, such as with a pressure sensitive adhesive 1126. The adhesive 1126 or the substrate 1125 may contain an optically absorbing filler or selectively applied coating to limit the continuous optical density in the plano regions 112'5, or a printed pattern array 1129 of opaque or partially transparent material (as shown in FIG. 20A), to provide between about 100% and ~1% transmission. The transmission is more preferably 10% to 50% and most preferably between about 10% to about 25% transmission.

It should be appreciated that the embodiments of FIG. 20A-B, FIGS. 21A and 21B deploying films 2124 and 2127 be beneficially used when applied directly to, in front of or behind window glazing 15, and do not need to be applied on an optical panel 1120 on an exterior frame 1110 that is pivoted away from the window 15.

Figure 22:
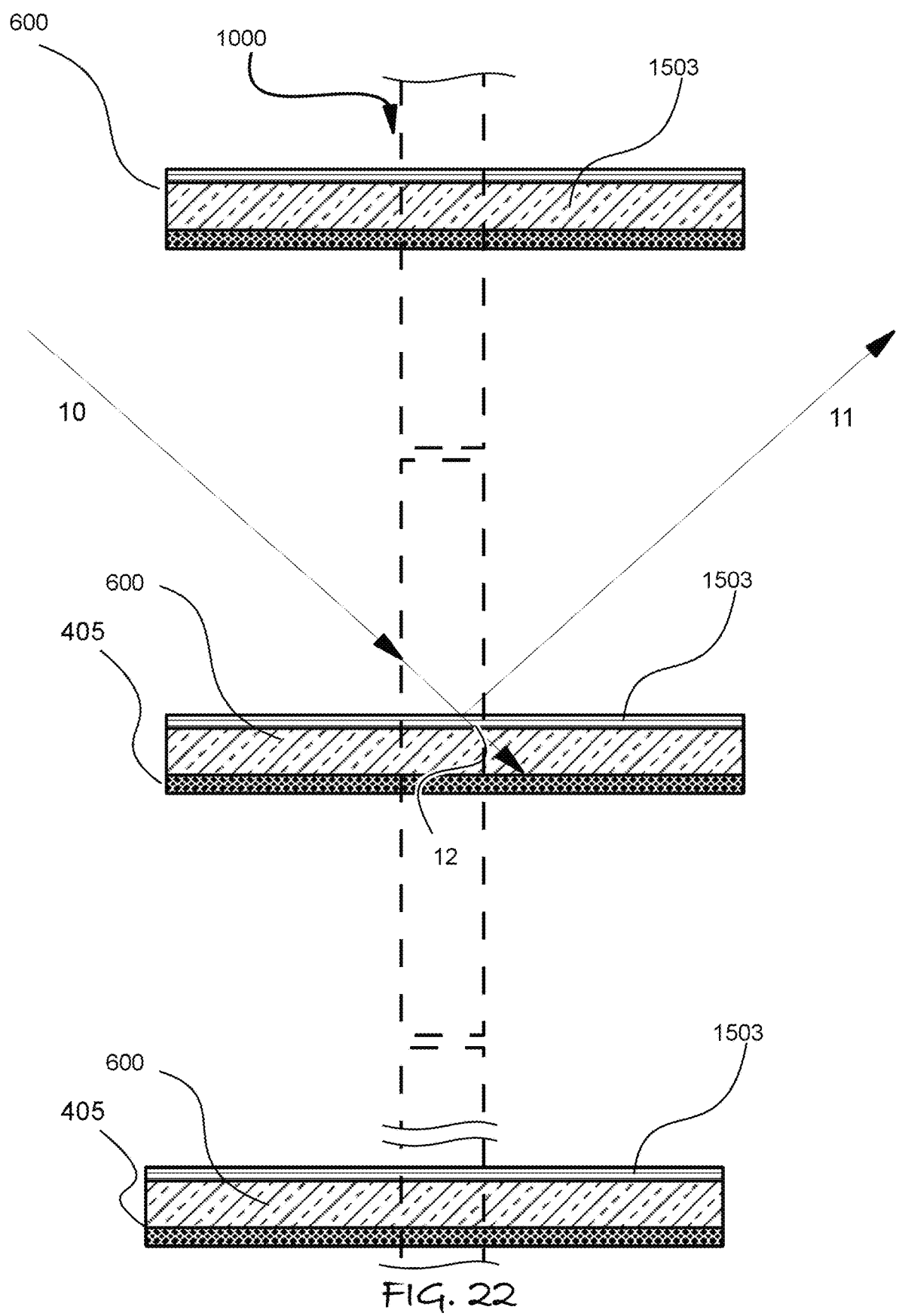
FIG. 22 is a side elevation view of an alternative embodiment of a light re-directing louver system that rejects IR radiation.

In a further embodiment, illustrated in FIG. 22, of the invention the louvers 600 can have multilayer coating 1503 that transmits infrared (IR) radiation but reflects visible light, commonly referred to as a "cold mirror". When deployed opposite the absorbing layer 405, such a coating 1503 would re-direct only the visible light into the room (ray 11), and the IR radiation rejecting element 1503 would transmit the IR radiation (ray 12) to be absorbed either by a back surface coating 405 on the reverse surface of the plano-plano optical element, or in the alternative via a sufficiently rigid absorbing substrate having the cold mirror coating disposed directly thereof.

Optionally, the back surface coating 405 can be a partially transparent material, to provide between about 100% and ~1% transmission. The transmission is more preferably 10% to 50% and most preferably between about 10% to about 25% transmission. The louvers 600 would not need to have an additional light redirection structure when the coating 1203 is the upper surface of the louver. When the louver 600 are oriented vertically (broken lines), a partially transmission of the layer 405 would offer a measure of privacy to the interior as well, as see through visibility. Layer 405 can have discrete dots, lines or other patterns of absorbing material to control the transmission level, as well as a dispersed or dissolvent dye type absorber to have essentially uniform spatial transmission levels.

Figures 23A, 23B:
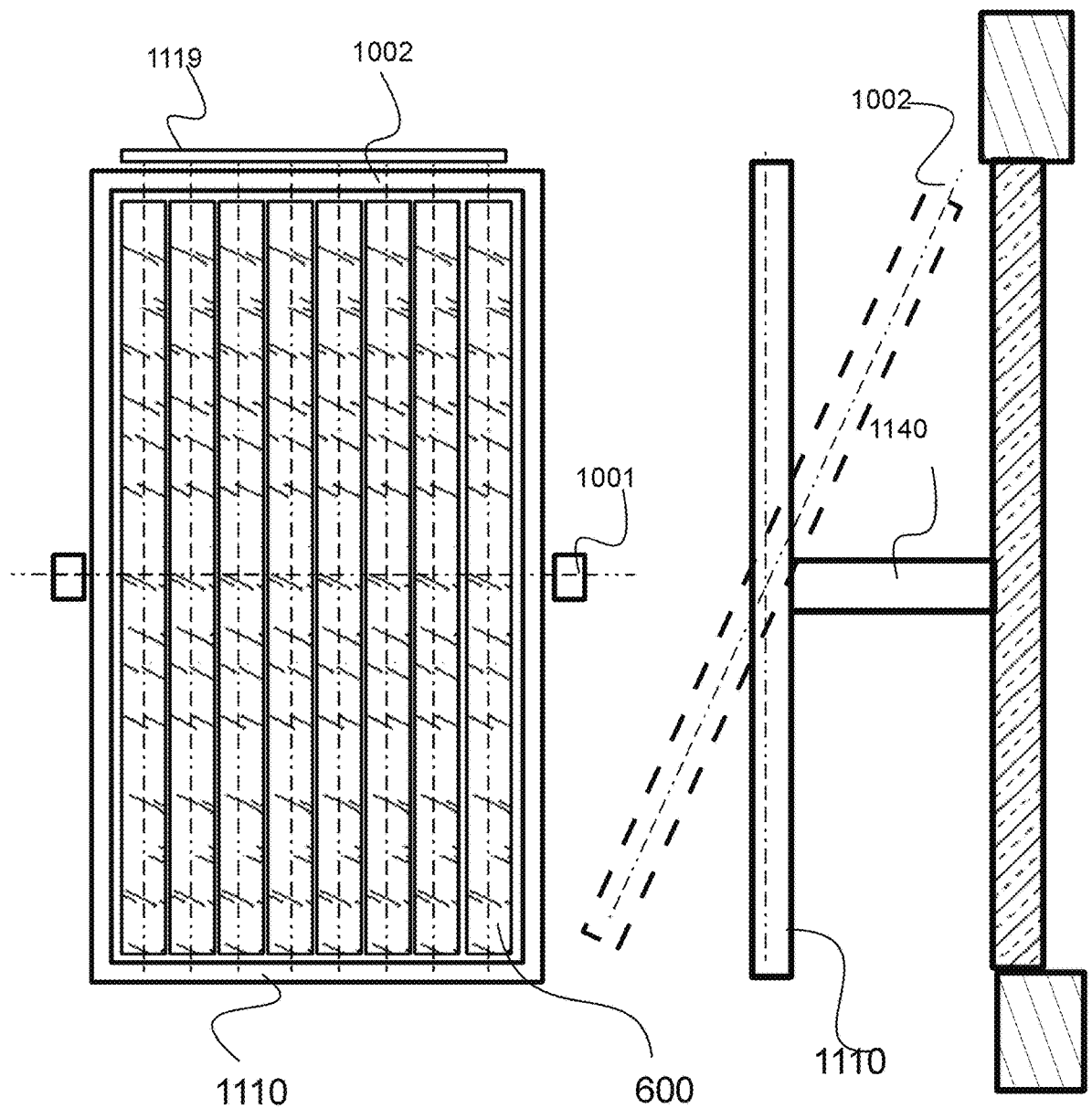
FIGS. 23A and 23B are front and side elevation view of another embodiment of the frame having elongated upright louvers disposed to rotate about an axis orthogonal to the rotation axis of the frame.

FIG. 23A-B illustrate another embodiment of the invention in which the louvers 600 are disposed to run vertically in the frame 1110, so that they have a rotation axis 1002 disposed orthogonal to the tilt axis 1001 of the frame. The frame 1110 and louvers 600 can be rotated by the control system generally described with respect to FIG. 10 and FIG. 11.

FIG. 24A-C illustrate an embodiment of the invention in which the frame 1100 is operative to rotate in the vertical plane thereof, as well as tilt away from the window as shown in other embodiments. FIG. 24A shows the frame 1110 upright, that is with sides vertical, whereas FIGS. 24B and 24C shows the frame 1110 rotated to the left and right respectively. The rotation of the frame 1110 allows for optimal collection and re-direction of sunlight as the sun moves from east to west and changes elevation and azimuthal angle during the day. The rotation of the frame 1110 is preferably accomplished by the opposing standoff 1140 on opposite sides of the frame 1110 having a distal end adjustable coupled to the wall in a curvilinear track 1141 that receives a curvilinear rails 1142. The curvilinear rails 1142 support the standoff 1140. The rails 1142 can rotate clockwise and counterclockwise in the fixed track 1141, and at least one of the rails 1142 is preferably driven by a stepper motor type actuator 9003 that is responsive to a controller 520 to change orientation in response to the changing solar elevation through the day and yearly cycles. As the rail 1142 is superimposed over the track 1141 in the vertical position of the frame 1110 in FIG. 24A, the track 1141 is not visible in this view until the stepper motor 9003, or the equivalent drive means, has rotated the frame 1110 as shown in FIGS. 24B and 24C. Frame 1110 may contain multiple louvers 600 that are rotated about axis 1002, by actuator 9002, and the frame 1110 is also preferably rotated away from the plane of the window by actuator 9001 which acts to rotate the frame 1110 with respect to axis 1001, that is associated with pivot assembly 1130, as illustrated in FIG. 12.

It should be appreciated that in any of the above embodiments the louvers 600 and panel 1120 can be on glass or polymeric substrates, and laminates of glass and polymer layers. Such polymeric layers are attractive for metal and dielectric mirrors, as the cost is much less than glass and the weight is reduced.

It should be appreciated that the embodiments wherein a controller is operative to pivot or rotate the louvers 600 and/or the frame 1110 in response to the movement of the sun, this sun tracking can be used to increase the available sunlight in the interior and/or control where the sunlight impinges on the walls or ceiling of the adjacent interior room. It should be understood that by tracking a trajectory of the sun we mean rotating one or more of the axis of the louvers 600 and/or frame 1110 to modify the interior illumination by some amount with respect to the interior illumination that would occur by light re-direction through some portion of the day if the louvers 600 or frame 1110 was static. Further, it should be understood that the controller in the various embodiment can be programmed to be operative to track the sun in a different manner through the day, year or season, for example by optimizing total interior light during some hours, while during other hours projecting the sun toward different regions of the interior or keeping the sun light re-directed to different or the same portions of the day as the sun moves. It should be appreciated that some embodiments will provide a greater extent of the ability to track the sun throughout the day than others, and selectively modify the interior illumination relative to a static panel 1110.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. An optical panel that comprises a plurality of monolithic and planar reflective elements spaced apart by an air gap and arranged in a stack that spans a height of the optical panel and each reflective element in said plurality has a reflective planar first surface and an opposing uniformly spaced apart planar second surface, in which the second surface is blackened to absorb substantially all incident light.

2. The optical panel of claim 1 in which the reflective first surface is provided by a metallic reflective layer that is one of on and within the reflective element.

3. The optical panel of claim 1 in which the reflective first surface is provided by a multilayer coating that comprises dielectric layers in which the multilayer coating is one of on and within the reflective element and is disposed in a common plane that is parallel to the first and second surface.

4. The optical panel of claim 3 in which multilayer coating is operative to reflect visible light and transmit infrared light such that infrared light transmitted through the reflective element is absorbed by the second surface.

5. The optical panel of claim 1 in which a front edge of each the reflective elements in the plurality are disposed in a common plane in which the optical panel further comprises at least one infrared reflective layer disposed in a plane that is parallel to the common plane.

6. The optical panel of claim 1 in which each of the reflective elements in said plurality are coupled in a pivotable engagement with the optical panel such that the orientation of the reflective first surface of each reflective element can be inverted such that the optical panel is operative to absorb light incident at a direction above a normal direction to the optical panel.

7. The optical panel of claim 1 further comprising support members that are coupled in pivotable engagement to provide a rotation of the optical panel by 180 degrees to orient the reflective first surface of each reflective element such that the optical panel is operative to absorb light incident at a direction above a normal direction to the optical panel.

8. An optical panel that comprises a plurality spaced apart reflective elements arranged in a stack that spans a height of the optical panel and each reflective element in said plurality has a reflective first surface and an opposing second surface, in which the second surface absorbs incident light in which a front edge of each the reflective elements in the plurality are disposed in a common plane in which the optical panel further comprises a first and a second infrared reflective layer, each disposed in a plane that is parallel to the common plane in which the reflective elements are disposed between the first and second infrared reflective layers.

* * * * *